United States Patent [19]

Murakami

[11] Patent Number: 5,982,946
[45] Date of Patent: Nov. 9, 1999

[54] METHOD OF IDENTIFYING DEFECTIVE PIXELS IN DIGITAL IMAGES, AND METHOD OF CORRECTING THE DEFECTIVE PIXELS, AND APPARATUS AND RECORDING MEDIA THEREFOR

[75] Inventor: Shigeo Murakami, Kyoto, Japan

[73] Assignee: Dainippon Screen Mfg. Co., Ltd., Kyoto, Japan

[21] Appl. No.: 08/924,314

[22] Filed: Sep. 5, 1997

[30] Foreign Application Priority Data

Sep. 20, 1996 [JP] Japan .................................. 8-250138
Sep. 20, 1996 [JP] Japan .................................. 8-250139

[51] Int. Cl.$^6$ .............................. G06K 9/40; G06K 9/46; G06T 5/00
[52] U.S. Cl. ............................ 382/272; 382/275; 382/205
[58] Field of Search .................................. 382/275, 221, 382/310, 254, 274, 260, 276, 272, 270, 205; 348/607, 618

[56] References Cited

U.S. PATENT DOCUMENTS 5,365,604  11/1994  Kwok et al. .............................. 382/275
5,598,226  1/1997  Kokaram .................................. 382/275
5,623,558  4/1997  Billawala et al. ...................... 382/275
5,805,216  5/1995  Tabei et al. .............................. 348/246

FOREIGN PATENT DOCUMENTS 0768621    4/1997  Germany ................................ 382/275
10150570   6/1998  Japan ..................................... 382/275
10150571   6/1998  Japan ..................................... 382/275

*Primary Examiner*—Scott Rogers
*Attorney, Agent, or Firm*—Nikaido Marmelstein Murray & Oram LLP

[57] ABSTRACT

A method of identifying defective pixels included in a digital image. The method includes the steps of designating a pixel adjacent the defective pixels in the digital image, setting an evaluation area, setting a defective pixel candidate, computing, as a line average, an average pixel value of each of lines above, below, leftward and rightward of the defective pixel candidate, diminishing the evaluation area by selecting an upper line, a lower line, a left line and a right line, computing a threshold pixel value for determining the defective pixels, from an average pixel value of each line, and comparing values of all pixels with the threshold pixel value to determine the defective pixels.

20 Claims, 15 Drawing Sheets

METHOD OF IDENTIFYING DEFECTIVE PIXELS IN DIGITAL IMAGES, AND METHOD OF CORRECTING THE DEFECTIVE PIXELS, AND APPARATUS AND RECORDING MEDIA THEREFOR

BACKGROUND OF THE INVENTION (1). Field of the Invention

This invention relates to a method, apparatus and recording medium for use in identifying pixels in a digital image which are not properly converted owing to dirt or dust (hereinafter called defective pixels) when an original image such as a reversal film or print is converted into the digital image by a reading device such as a scanner. In particular, the invention relates to a technique of identifying defective pixels in a digital image with little effort.

This invention also relates to a method, apparatus and recording medium for use in correcting defective pixels identified in a digital image, and particularly to a technique of preventing loss of the texture of an original image due to the correction of defective pixels.

(2). Description of the Related Art

When an original image such as a reversal film or color print is converted into a digital image by a reading device such as a scanner, dirt or dust may be adhering to the original image or to the reading device. Then, the portion of the original image carrying or corresponding to the dirt or dust is not properly converted into a digital image but becomes unwanted defective pixels. That is, the digital image converted in such a condition includes unwanted defective pixels as well as normal pixels properly converted from the original image. The digital image including such unwanted defective pixels, as it is, has poor quality. Usually, the defective pixels are removed for improved quality.

Such defective pixels, ideally, are removed fully automatically without requiring a manual operation, but such technical level has not been attained to date. Thus, an operation requiring little effort of the operator and a digital image giving no visual incongruity after removal of defective pixels are the two technical points at issue today.

The operation to remove defective pixels includes a plurality of steps, e.g. identifying defective pixels, and correcting the defective pixels identified. Among these steps, what burdens the operator is the step of identifying defective pixels present in a digital image. Varied methods of identifying defective pixels have been in practical use, which are set out hereunder in the order of weight of burden. The following operations are carried out by the operator using a mouse while observing a digital image appearing on a display, for example:

(1) Designate one defective pixel after another.

(2) Mark a free curve around the defective pixels.

(3) Designate two points to form a rectangular or circular area including the defective pixels.

The following method has been proposed as one alleviating the operator's burden, but has not been in practical use yet:

(4) Designate a defective pixel or a position adjacent thereto.

Obviously, among the above methods, the method (4) requires only a single designating operation and therefore imposes the least burden on the operator. The following obstacles exist in implementation of this proposed method.

Assume that, as shown in FIG. 1, a fixed evaluation area ER is set around one defective pixel DP1 designated, and all the pixels in the evaluation area ER are identified as defective pixels. Then, a defective pixel DP2 (not designated) in this area may automatically be identified as a defective pixel, but normal pixels NP in the evaluation area ER also are identified as defective pixels. When the values of the defective pixels (including normal pixels NP and defective pixels DP1 and DP2) identified are corrected such as by interpolation from the values of normal pixels present outside the evaluation area ER, the normal pixels NP requiring no correction are corrected also. The resulting digital image tends to lose the texture of the original image.

It is conceivable to identify the defective pixels in the evaluation area ER based on a certain threshold value, instead of identifying all the pixels in the evaluation area ER as defective pixels as noted above. As shown in FIG. 1, the evaluation area ER may include dark normal pixels NP' representing a shadow or black wall. If defective pixels are discriminated based on a threshold value simply determined, these normal pixels NP' will also be identified as defective pixels. Here again, the texture of the original image tends to be lost.

These drawbacks are obstructive to implementation of the proposed method (4).

As noted hereinbefore, it is an important technical consideration also to realize, after removal of defective pixels, a digital image including no unnatural level difference around the defective pixels, and thus giving no visual incongruity. That is, the texture of an original image should be maintained as much as possible.

The methods of identifying defective pixels include those described above. The following may be cited as typical methods of correcting the defective pixels identified:

(a) Pixel Copying Method:

For example, the operator visually identifies one defective pixel after another, and copies the value of a normal pixel adjacent each defective pixel for use as the value of the defective pixel.

This method has probably been used most extensively since electronic image processing began to be practiced. However, this method requires a perfect agreement between the values of normal pixels adjacent a defective pixel identified and the tone of the normal pixel copied. Without such agreement, a level difference in tone will occur with the corrected defective pixel, thereby impairing texture. A defective pixel correcting operation based on this method, therefore, imposes a heavy burden on the operator, and requires a high level of skill. This poses a problem that the operator's capabilities are manifestly reflected in image quality. Naturally, a large number of defective pixels will require a long working time.

(b) Method of Correcting Defective Pixel Based on Pixel Values of Surrounding Normal Pixels:

This method has advantages over the above pixel copying method in that the burden on the operator is alleviated, the operator's skill is immaterial, and a large number of defective pixels may be processed in a short time.

With this method, defective pixels are identified by one of the above methods (1)–(4), a corrected value is derived from the values of normal pixels surrounding the defective pixels, and is substituted for the values of the defective pixels. This method will particularly be described with reference to FIG. 2. A digital image F includes defective pixels DP (marked with "X" signs) as well as normal pixels NP. An average value of those normal pixels (marked with circles) surrounding the defective pixels DP is computed and substituted for the pixel values of all of the defective pixels DP.

The method (b) above has the advantage of not relying on the operator's skill, but has the following drawback also.

In the event of only one defective pixel DP, this method is perfectly capable of correcting it without impairing texture. However, there are usually two or more, if any, defective pixels DP as shown in FIG. 2. The same pixel value substituted for the values of all of the defective pixels DP would result in a texture deterioration.

The defective pixels DP may exist in an area (called vignette) where the pixel values (tone) change smoothly. In such a case in particular, the same pixel value substituted for the values of all of the defective pixels DP would even create a large level difference to bring about a serious texture deterioration.

SUMMARY OF THE INVENTION

This invention has been made having regard to the state of the art noted above. It is therefore a primary object of this invention to provide a method, apparatus and recording medium for use in identifying defective pixels in a digital image, which minimize the operator's burden by determining a threshold value based on pixel values in a limited rectangular frame of evaluation area.

A further object of this invention is to provide a method, apparatus and recording medium for use in correcting defective pixels in a digital image, which minimize a texture deterioration by devising an order of correcting the defective pixels.

The primary object noted above is fulfilled, according to this invention, by a method of identifying defective pixels in a digital image converted from an original image by a reading device, the digital image including normal pixels properly converted from the original image, and the defective pixels due to dirt or dust, the method comprising the steps of:

(a) designating a pixel adjacent the defective pixels in the digital image;

(b) setting, as an evaluation area, a group of pixels included in a predetermined area size centering on the pixel designated;

(c) setting, as a defective pixel candidate, a pixel having the darkest value among pixels in a central portion of the evaluation area;

(d) computing line averages of pixels around the defective pixel candidate, among pixels in the evaluation area, the line averages being average pixel values, respectively, of upper lines of pixels arranged horizontally above the defective pixel candidate, lower lines of pixels arranged horizontally below the defective pixel candidate, left lines of pixels arranged vertically and leftward of the defective pixel candidate, and right lines of pixels arranged vertically and rightward of the defective pixel candidate;

(e) diminishing the evaluation area by selecting a line having the lightest line average from each group of the upper lines, the lower lines, the left lines and the right lines;

(f) computing a threshold pixel value for determining the defective pixels, from an average pixel value of a rectangular frame defined by the lines selected one each for upper, lower, left and right sides of the rectangular frame; and (g) comparing values of all pixels in the rectangular frame with the threshold pixel value, and determining pixels having values darker than the threshold value to be the defective pixels.

The operator recognizes the defective pixels included in the digital image, and designates a selected one of the defective pixels or a pixel adjacent thereto (step (a)). A group of pixels included in a predetermined area size centering on the pixel designated is set as an evaluation area (step (b)). Since the operator designates a pixel in the digital image, with the defective pixels in mind, the defective pixels always exist in a central portion of the evaluation area. Then, a pixel having the darkest value among pixels in the central portion of the evaluation area is detected and set as a defective pixel candidate (step (c)).

Next, upper lines of pixels arranged horizontally above the defective pixel candidate are determined among pixels in the evaluation area. An average pixel value of each upper line is computed as a line average. That is, average pixel values of the respective rows of pixels in the evaluation area above the defective pixel candidate are computed and set as line averages. Similarly, average pixel values of the respective rows of pixels below the defective pixel candidate are computed as line averages. Further, left lines of pixels arranged vertically and leftward of the defective pixel candidate are determined, and an average pixel value of each left line is computed as a line average. That is, average pixel values of the respective columns of pixels in the evaluation area leftward of the defective pixel candidate are computed and set as line averages. Similarly, average pixel values of the respective columns of pixels rightward of the defective pixel candidate are computed as line averages (step (d)).

Next, the evaluation area is diminished by selecting a line having the lightest line average from each group of the upper lines, lower lines, left lines and right lines (step (e)). That is, the lightest pixel line is selected from each group of the rows of pixels arranged above and below the defective pixel candidate and the columns of pixels arranged leftward and rightward of the defective pixel candidate in the evaluation area. In this way, the evaluation area is diminished from the predetermined size. By diminishing the evaluation area based on the pixel values, part of the normal pixels remote from the defective pixel candidate but lying in the evaluation area may be excluded from the subsequent processes.

A threshold pixel value is computed from an average pixel value of a rectangular frame defined by the lines selected one each for upper, lower, left and right sides of the rectangular frame, the threshold pixel value serving as a reference for determining the defective pixels (step (f)). The following is the reason for computing the threshold value from the pixels forming the rectangular frame rather than the area enclosed by the above lines. The area defined by these lines includes therein a mixture of defective pixels, including the defective pixel candidate, and the normal pixels. It would therefore be impossible to distinguish accurately between defective pixels and normal pixels by computing a threshold value from the pixel values within the rectangular frame. Thus, the threshold value is computed from the average pixel value of the rectangular frame which includes only normal pixels having lighter values than the defective pixels (which frame is defined by the rows and columns of pixels having the lightest values).

The values of all pixels in the rectangular frame are compared with the threshold pixel value, and pixels having values darker than the threshold value are determined to be the defective pixels (step (g)). As noted above, the threshold value is determined based on the average pixel value of the rectangular frame which includes only normal pixels, and the defective pixels are identified only among the pixels lying within the frame diminished from the evaluation area. Thus, only the defective pixels are correctly identified as such. Since the operator has only to designate a pixel adjacent the defective pixels first, the defective pixels may be identified with the least effort.

Thus, even where the evaluation area includes normal pixels having dark values, these pixels, if lying away from the pixel designated by the operator, are never mistaken for defective pixels. Only the defective pixels are correctly identified. The effort required of the operator is minimal since only a single pixel close to the defective pixels needs to be designated first. This realizes implementation of a method capable of identifying defective pixels while minimizing the operator's effort. After identifying the defective pixels included in the digital image, their values are corrected by interpolation or other technique. The resulting image has high quality without loss of texture.

Preferably, the method according to this invention, further comprises a step of setting an area size prior to the step (a).

By setting an area size which determines the evaluation area, the size of the evaluation area may be varied according to forms of defective pixels, such as when a group of defective pixels exceeds the evaluation area or when defective pixels are scattered to a plurality of locations. Thus, defective pixels in varied sizes and forms may be identified correctly, to realize a flexible identification of defective pixels.

This invention also provides an apparatus for identifying defective pixels in a digital image converted from an original image by a reading device, the digital image including normal pixels properly converted from the original image, and the defective pixels due to dirt or dust. This apparatus comprises:

a storage device for storing the digital image;

a display device for displaying the digital image;

a designating device for designating a pixel adjacent the defective pixels in the digital image displayed on the display device;

an evaluation area setting device for setting, as an evaluation area, a group of pixels included in a predetermined area size centering on the pixel designated;

a defective pixel candidate setting device for setting, as a defective pixel candidate, a pixel having the darkest value among pixels in a central portion of the evaluation area;

an average computing device for computing line averages of pixels around the defective pixel candidate, among pixels in the evaluation area, the line averages being average pixel values, respectively, of upper lines of pixels arranged horizontally above the defective pixel candidate, lower lines of pixels arranged horizontally below the defective pixel candidate, left lines of pixels arranged vertically and leftward of the defective pixel candidate, and right lines of pixels arranged vertically and rightward of the defective pixel candidate;

an area limiting device for diminishing the evaluation area by selecting a line having the lightest line average from each group of the upper lines, the lower lines, the left lines and the right lines;

a threshold computing device for computing a threshold pixel value for determining the defective pixels, from an average pixel value of a rectangular frame defined by the lines selected one each for upper, lower, left and right sides of the rectangular frame; and a defective pixel discriminating device for comparing values of all pixels in the rectangular frame with the threshold pixel value, and determining pixels having values darker than the threshold value to be the defective pixels.

While the digital image stored in the storage device is displayed on the display device, the operator designates a selected defective pixel or a pixel adjacent thereto by operating the designating device. The evaluation area setting device sets, as an evaluation area, a group of pixels included in a predetermined area size centering on the pixel designated. Since the operator designates a pixel in the digital image, with the defective pixels in mind, the defective pixels always exist in a central portion of the evaluation area. Then, the defective pixel candidate setting device sets, as a defective pixel candidate, a pixel having the darkest value among pixels in the central portion of the evaluation area.

The average computing device determines upper lines of pixels arranged horizontally above the defective pixel candidate among pixels in the evaluation area, and computes an average pixel value of each upper line as a line average. That is, average pixel values of the respective rows of pixels in the evaluation area above the defective pixel candidate are computed and set as line averages. Similarly, average pixel values of the respective rows of pixels below the defective pixel candidate are computed as line averages. Further, left lines of pixels arranged vertically and leftward of the defective pixel candidate are determined, and an average pixel value of each left line is computed as a line average. That is, average pixel values of the respective columns of pixels in the evaluation area leftward of the defective pixel candidate are computed and set as line averages. Similarly, average pixel values of the respective columns of pixels rightward of the defective pixel candidate are computed as line averages.

The area limiting device diminishes the evaluation area by selecting a line having the lightest line average, computed by the average computing device, from each group of the upper lines, lower lines, left lines and right lines. By diminishing the evaluation area based on the pixel values, part of the normal pixels remote from the defective pixel candidate but lying in the evaluation area may be excluded from the subsequent processes.

The threshold computing device computes a threshold pixel value from an average pixel value of a rectangular frame defined by the lines selected, the threshold pixel value serving as a reference for determining the defective pixels. The defective pixel discriminating device compares the values of all pixels in the rectangular frame with the threshold pixel value, and determines pixels having values darker than the threshold value to be the defective pixels. As noted above, the threshold value is determined based on the average pixel value of the rectangular frame which includes only normal pixels, and the defective pixels are identified only among the pixels lying within the frame diminished from the evaluation area. Thus, only the defective pixels are correctly identified as such. Since the operator has only to designate a pixel adjacent the defective pixels first through the designating device, the defective pixels may be identified with the least effort.

Further, this invention provides a recording medium storing a program for identifying defective pixels in a digital image converted from an original image by a reading device, the digital image including normal pixels properly converted from the original image, and the defective pixels due to dirt or dust. This program instructs a computer to carry out the following processes:

(a) designating a pixel adjacent the defective pixels in the digital image;

(b) setting, as an evaluation area, a group of pixels included in a predetermined area size centering on the pixel designated;

(c) setting, as a defective pixel candidate, a pixel having the darkest value among pixels in a central portion of the evaluation area;

(d) computing line averages of pixels around the defective pixel candidate, among pixels in the evaluation area, the line averages being average pixel values, respectively, of upper lines of pixels arranged horizontally above the defective pixel candidate, lower lines of pixels arranged horizontally below the defective pixel candidate, left lines of pixels arranged vertically and leftward of the defective pixel candidate, and right lines of pixels arranged vertically and rightward of the defective pixel candidate;

(e) diminishing the evaluation area by selecting a line having the lightest line average from each group of the upper lines, the lower lines, the left lines and the right lines;

(f) computing a threshold pixel value for determining the defective pixels, from an average pixel value of a rectangular frame defined by the lines selected one each for upper, lower, left and right sides of the rectangular frame; and (g) comparing values of all pixels in the rectangular frame with the threshold pixel value, and determining pixels having values darker than the threshold value to be the defective pixels.

The program stored in the recording medium is executed by the computer to allow the operator to recognize the defective pixels included in the digital image, and designate one of the defective pixels or a pixel adjacent thereto. The computer sets, as an evaluation area, a group of pixels included in a predetermined area size centering on the pixel designated. Since the operator designates a pixel in the digital image, with the defective pixels in mind, the defective pixels always exist in a central portion of the evaluation area. Then, a pixel having the darkest value among pixels in the central portion of the evaluation area is detected and set as a defective pixel candidate.

Next, the computer determines upper lines of pixels arranged horizontally above the defective pixel candidate among pixels in the evaluation area, and computes an average pixel value of each upper line as a line average. Similarly, average pixel values of lower lines of pixels below the defective pixel candidate are computed as line averages. Further, left lines of pixels arranged vertically and leftward of the defective pixel candidate are determined, and an average pixel value of each left line is computed as a line average. Similarly, average pixel values of right lines of pixels rightward of the defective pixel candidate are computed as line averages.

Next, the computer diminishes the evaluation area by selecting a line having the lightest line average from each group of the upper lines, lower lines, left lines and right lines. By diminishing the evaluation area based on the pixel values, part of the normal. pixels remote from the defective pixel candidate but lying in the evaluation area may be excluded from the subsequent processes. A threshold pixel value is computed from an average pixel value of a rectangular frame defined by the lines selected one each for upper, lower, left and right sides of the rectangular frame, the threshold pixel value serving as a reference for determining the defective pixels.

The computer compares the values of all pixels in the rectangular frame with the threshold pixel value, and determines pixels having values darker than the threshold value to be the defective pixels. As noted above, the threshold value is determined based on the average pixel value of the rectangular frame which includes only normal pixels, and the defective pixels are identified only among the pixels lying within the frame diminished from the evaluation area. Thus, only the defective pixels are correctly identified as such. Since the operator has only to designate a pixel adjacent the defective pixels to the computer, the defective pixels may be identified with the least effort.

The second object noted hereinbefore is fulfilled, according to this invention, by a method of correcting defective pixels in a digital image converted from an original image by a reading device, the defective pixels being caused by dirt or dust, the method comprising the steps of:

(a) identifying the defective pixels in the digital image;

(b) computing, for each of the defective pixels, the number of defective pixels consecutive in a direction across rows as a consecution number in the direction across rows, and the number of defective pixels consecutive in a direction across columns as a consecution number in the direction across columns;

(c) determining a minimum consecution number among the consecution numbers in the direction across rows and the consecution numbers in the direction across columns, and determining a defective pixel having the minimum consecution number to be a minimum defective pixel;

(d) computing a corrected value for the minimum defective pixel from values of normal pixels opposed to each other across the minimum defective pixel in a direction of the minimum consecution number;

(e) substituting the corrected value for a value of the minimum defective pixel;

(f) regarding the minimum defective pixel as a normal pixel; and (g) repeating steps (b) through (f) until all of the defective pixels become normal pixels.

First, the defective pixels in the digital image are identified by designating one defective pixel after another or by distinguishing the defective pixels based on a threshold value after designating an area including the defective pixels (step (a)).

For each defective pixel identified, the number of defective pixels arranged consecutively in the direction across rows of pixels is obtained as the "consecution number in the direction across rows". The direction across rows refers to the direction in which the number of rows in a matrix varies, i.e. the vertical direction of pixels. That is, the number of consecutive defective pixels along each column is computed. Further, the number of defective pixels arranged consecutively in the direction across columns of pixels is obtained as the "consecution number in the direction across columns". The direction across columns refers to the direction in which the number of columns in the matrix varies, i.e. the horizontal direction of pixels. That is, the number of consecutive defective pixels along each row is computed (step (b)).

After computing the consecution numbers in the direction across rows and in the direction across columns, the smallest number thereof is determined as the "minimum consecution number". That is, the minimum consecution number is the consecution number in the direction across rows or columns of one of the defective pixels. The defective pixel having the minimum consecution number is determined to be a "minimum defective pixel" (step (c)). The minimum defective pixel has the smallest number of defective pixels therearound, in particular arranged therewith in the direction corresponding to the minimum consecution number (i.e. in the direction across rows or columns). In other words, the minimum defective pixel among the defective pixels lies closest to normal pixels.

Next, a corrected pixel value is computed from the values of normal pixels opposed to each other across the minimum defective pixel in the direction corresponding to the minimum consecution number of the minimum defective pixel (i.e. in the direction across rows or columns)(step (d)). The minimum defective pixel has the smallest number of defective pixels arranged therewith in the direction corresponding to the minimum consecution number, and lies closest to normal pixels. By computing a corrected pixel value from the values of normal pixels opposed to each other across the minimum defective pixel, the values of surrounding normal pixels may be reflected in the corrected pixel value as much as possible. The corrected pixel value is substituted for the value of the minimum defective pixel (step (e)). The corrected defective pixel is regarded as a normal pixel (step (f)).

After correcting the value of the minimum defective pixel as described above, the steps (b) et seq. are repeated for computing the "consecution number in the direction across rows" and the "consecution number in the direction across columns" for each remaining defective pixel until all of the defective pixels become normal pixels (step (g)). In this way, the defective pixels are corrected successively in the order of closeness to normal pixels. Instead of correcting the defective pixels to have the same value, the values of normal pixels adjacent the defective pixels are reflected as much as possible. Consequently, the correction is made in a way to suppress incongruity and to minimize texture deterioration in the digital image.

In the method according to this invention, preferably, the corrected value is computed at step (d) by linear interpolation from values of two normal pixels opposed to each other across the minimum defective pixel.

By computing the corrected value by linear interpolation from the values of two normal pixels opposed to each other across the minimum defective pixel, the values of normal pixels adjacent the defective pixels are reflected with increased effect. This provides a greater effect of suppressing incongruity with surrounding normal pixels and avoiding texture deterioration in the digital image.

In a further aspect of this invention, there is provided an apparatus for correcting defective pixels in a digital image converted from an original image by a reading device, the defective pixels being caused by dirt or dust. This apparatus comprises:

a storage device for storing the digital image;

a display device for displaying the digital image;

a defective pixel identifying device for identifying the defective pixels in the digital image displayed on the display device;

a consecution number computing device for computing, for each of the defective pixels, the number of defective pixels consecutive in a direction across rows as a consecution number in the direction across rows, and the number of defective pixels consecutive in a direction across columns as a consecution number in the direction across columns;

a minimum defective pixel computing device for determining a minimum consecution number among the consecution numbers in the direction across rows and the consecution numbers in the direction across column, and determining a defective pixel having the minimum consecution number to be a minimum defective pixel;

a corrected pixel value computing device for computing a corrected value for the minimum defective pixel from values of normal pixels opposed to each other across the minimum defective pixel in a direction of the minimum consecution number;

a pixel correcting device for substituting the corrected value for a value of the minimum defective pixel, the minimum defective pixel being now regarded as a normal pixel; and a control device for repeatedly controlling the consecution number computing device, the minimum defective pixel computing device, the corrected pixel value computing device and the pixel correcting device until all of the defective pixels become normal pixels.

While the digital image stored in the storage device is displayed on the display device, the defective pixel identifying device identifies the defective pixels in the digital image. The defective pixel identifying device may comprise the type for allowing the operator to designate one defective pixel after another with a mouse or the like, or the type which automatically identifies the defective pixels based on a threshold value, for example, among pixels included in a fixed area around one spot designated by the operator.

The consecultion number computing device computes, for each defective pixel, the number of defective pixels arranged consecutively in the direction across rows of pixels as the "consecution number in the direction across rows". The direction across rows refers to the direction in which the number of rows in a matrix varies, i.e. the vertical direction of pixels. Further, the number of defective pixels arranged consecutively in the direction across columns of pixels is computed as the "consecution number in the direction across columns". The direction across columns refers to the direction in which the number of columns in the matrix varies, i.e. the horizontal direction of pixels.

After the consecution numbers in the direction across rows and in the direction across columns are computed, the minimum defective pixel computing device determines the smallest number thereof as the "minimum consecution number". Then, the minimum defective pixel computing device determines a defective pixel having the minimum consecution number to be a "minimum defective pixel". The minimum defective pixel has the smallest number of defective pixels therearound, in particular arranged therewith in the direction corresponding to the minimum consecution number (i.e. in the direction across rows or columns).

The corrected pixel value computing device computes a corrected value for the minimum defective pixel from the values of normal pixels opposed to each other across the minimum defective pixel in the direction corresponding to the minimum consecution number of the minimum defective pixel. The minimum defective pixel has the smallest number of defective pixels arranged therewith in the direction corresponding to the minimum consecution number, and lies closest to normal pixels. By computing a corrected pixel value from the values of normal pixels opposed to each other across the minimum defective pixel, the values of surrounding normal pixels may be reflected in the corrected pixel value as much as possible. The pixel correcting device substitutes the corrected pixel value for the value of the minimum defective pixel. The corrected defective pixel is regarded as a normal pixel.

After the value of the minimum defective pixel is corrected as described above, the control device repeatedly controls the consecution number computing device, minimum defective pixel computing device, corrected pixel value computing device and pixel correcting device until all of the defective pixels become normal pixels. In this way, the defective pixels are corrected successively in the order of closeness to normal pixels. Instead of correcting the defective pixels to have the same value, the values of normal pixels adjacent the defective pixels are reflected as much as possible. Consequently, the correction is made in a way to suppress incongruity and to minimize texture deterioration in the digital image.

Further, this invention provides a recording medium storing a program for correcting defective pixels in a digital image converted from an original image by a reading device, the defective pixels being caused by dirt or dust. This program instructs a computer to carry out the following processes:

(a) identifying the defective pixels in the digital image;

(b) computing, for each of the defective pixels, the number of defective pixels consecutive in a direction across rows as a consecution number in the direction across rows, and the number of defective pixels consecutive in a direction across columns as a consecution number in the direction across columns;

(c) determining a minimum consecution number among the consecution numbers in the direction across rows and the consecution numbers in the direction across column, and determining a defective pixel having the minimum consecution number to be a minimum defective pixel;

(d) computing a corrected value for the minimum defective pixel from values of normal pixels opposed to each other across the minimum defective pixel in a direction of the minimum consecution number;

(e) substituting the corrected value for a value of the minimum defective pixel;

(f) regarding the minimum defective pixel as a normal pixel; and (g) repeating steps (b) through (f) until all of the defective pixels become normal pixels.

The program stored in the recording medium is executed by the computer to identify the defective pixels in the digital image first. For each defective pixel identified, the program causes the computer to compute the number of defective pixels arranged consecutively in the direction across rows of pixels as the "consecution number in the direction across rows", and the number of defective pixels arranged consecutively in the direction across columns of pixels as the "consecution number in the direction across columns".

After computing the consecution numbers in the direction across rows and in the direction across columns, the smallest number thereof is determined as the "minimum consecution number". The defective pixel having the minimum consecution number is determined to be a "minimum defective pixel". Next, a corrected pixel value is computed from the values of normal pixels opposed to each other across the minimum defective pixel in the direction corresponding to the minimum consecution number of the minimum defective pixel. The corrected pixel value is substituted for the value of the minimum defective pixel. The corrected defective pixel is regarded as a normal pixel.

After correcting the value of the minimum defective pixel as described above, the computer repeats the process of computing the "consecution number in the direction across rows" and the "consecution number in the direction across columns" and the subsequent processes for each remaining defective pixel until all of the defective pixels become normal pixels. In this way, the defective pixels are corrected successively in the order of closeness to normal pixels. Instead of correcting the defective pixels to have the same value, the values of normal pixels adjacent the defective pixels are reflected as much as possible. Consequently, the correction is made in a way to suppress incongruity.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Preferred embodiments of this invention will be described in detail hereinafter with reference to the drawings.

First Embodiment

Figure 3:
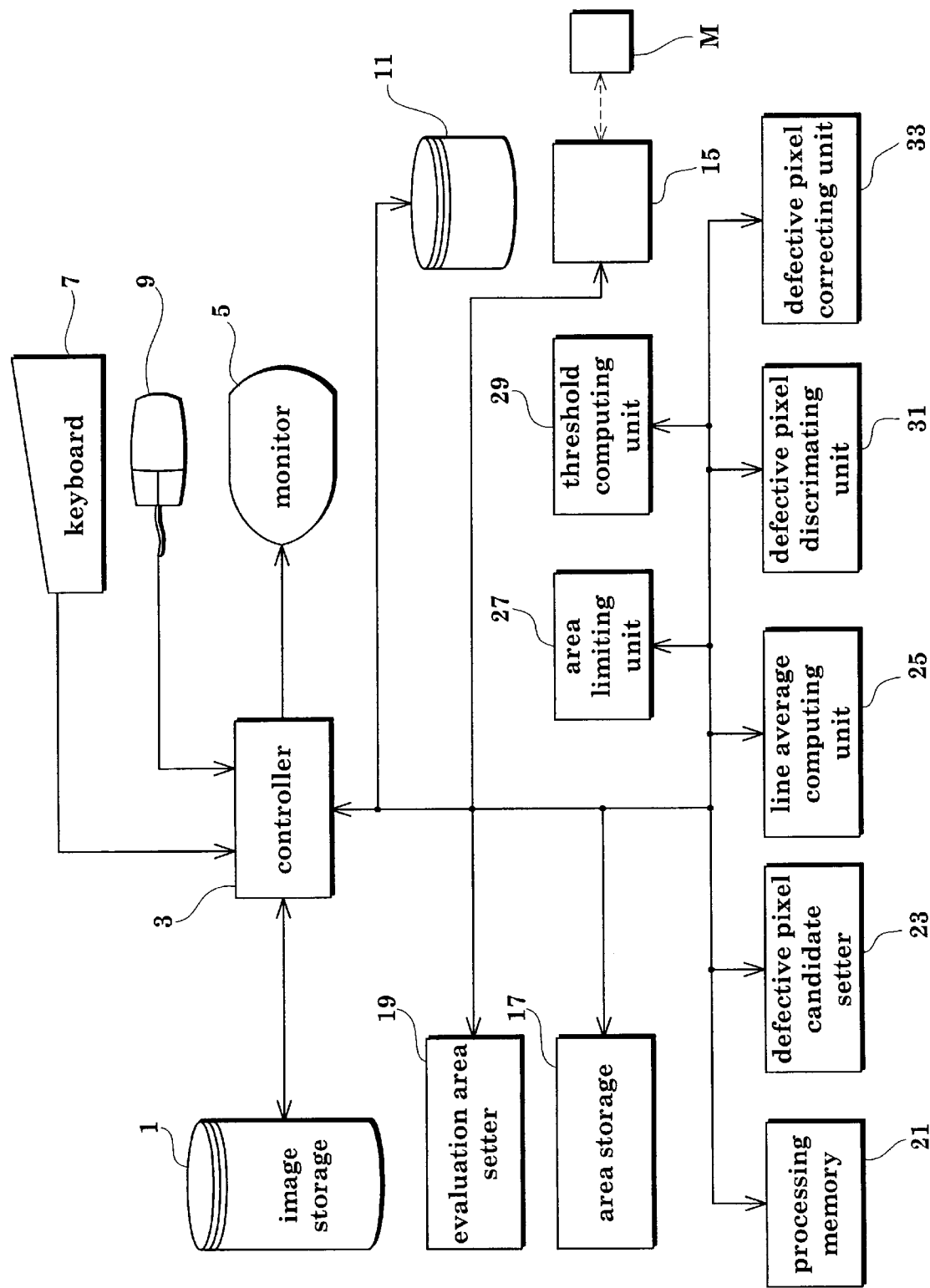
FIG. 3 is a block diagram of an image processing apparatus for executing a method of identifying defective pixels in a first embodiment of this invention.

FIG. 3 is a block diagram of an image processing apparatus for performing image processing including a method of identifying defective pixels in a digital image according to this invention.

Numeral 1 in FIG. 3 denotes an image storage for storing a plurality of digital images The image storage 1 is in the form of a hard disk or magneto-optical disk having a large storage capacity. The image storage 1 corresponds to the storage device of this invention. Each digital image is obtained by converting an original image such as a color reversal film or color print with a scanner (reading device) not shown. In the presence of dirt or dust adhering to the original image or a reading part of the scanner at a reading time, the corresponding portion is not properly converted and becomes defective pixels.

It is assumed here that a digital image stored in the image storage 1 includes such defective pixels as well as normal pixels properly converted from the original image without being affected by dust or the like. Where the original image is in color, the resulting digital image generally includes information on each of the three RGB colors. To facilitate understanding, a digital image expressed in black-and-white tones will be described hereinafter. The digital image in black-and-white tones and quantized by 8 bits has pixel values from 0 to 255. In the following description, pixel values close to "0" are referred to as dark, and pixel values close to "255" as light.

When the operator selects one of the digital images stored in the image storage 1, a controller 3 causes a monitor 5, which corresponds to the display device, to display the selected image. The digital image is selected by using a keyboard 7 or a mouse 9 corresponding to the designating device. The controller 3 is in the form of a CPU, RAM and ROM. This image processing apparatus may have a program already stored in a storage 11 for causing the controller 3 to execute the processes described hereinafter, or may read such a program from a recording medium M such as a floppy disk, magneto-optical disk or IC card mounted in a drive 15. In this example, the controller 3 reads the program from the recording medium M through the drive 15, and executes the processes based thereon as described in detail hereinafter. The program may be read only once in time of apparatus startup. To facilitate understanding, the processes described hereinafter are also presented functionally in the block diagram.

An area storage 17 stores an area size set in advance. The operator may change the area size, as desired, by directly inputting a numerical value (e.g. number of dots) through the keyboard 7 or indirectly inputting a numerical value through the mouse 9. The following description is made assuming a size of 15×15 dots is set in advance. An evaluation area setter 19 refers to the area size stored in the area storage 17, sets as an evaluation area a group of pixels in an area including a spot designated by the operator, and transfers the group of pixels included in the evaluation area to a processing memory 21.

The area storage 17 corresponds to the area setting device of this invention. The evaluation area setter 19 corresponds to the evaluation area setting device of this invention.

A defective pixel candidate setter 23 sets, as a "defective pixel candidate", the pixel having the darkest value among a group of pixels present around the center of the evaluation area transferred to the processing memory 21. A line average computing unit 25 computes an average of pixel values on each upper line extending horizontally, i.e. each upper row of pixels, above the defective pixel candidate among the group of pixels stored in the processing memory 21. Similarly, an average is computed of pixel values on each lower line below the defective pixel candidate. An average is computed of pixel values on each line extending vertically, i.e. each column of pixels, leftward of the defective pixel candidate. Further, an average is computed of pixel values on each line extending vertically, i.e. each column of pixels, rightward of the defective pixel candidate.

The above defective pixel candidate setter 23 and line average computing unit 25 correspond to the defective pixel candidate setting device and average computing device of this invention, respectively.

An area limiting unit 27 corresponding to the area limiting device diminishes the evaluation area by selecting the lightest line in each direction based on the average pixel values of the respective lines computed by the line average computing unit 25. A threshold computing unit 29 computes an average of pixel values, and a distribution thereof, in a rectangular frame defined by the upper, lower, left and right lines selected by the area limiting unit 27. As described in detail hereinafter, the threshold computing unit 29 further computes a threshold value for determining defective pixels. A defective pixel discriminating unit 31 refers to the threshold value computed, and compares the threshold value with the values of pixels in the area defined by the rectangular frame, among the group of pixels stored in the processing memory 21. The pixels found to have darker values than the threshold value are determined to be defective pixels.

The threshold computing unit 29 corresponds to the threshold computing device of this invention. The defective pixel discriminating unit 31 corresponds to the defective pixel discriminating device of this invention.

After the above defective pixel identifying process is completed, coordinate values and position data of the pixels identified as defective pixels are transferred, along with the pixel values, to a defective pixel correcting unit 33. The defective pixel correcting unit 33 corrects the pixel values in the processing memory 21 by interpolation or the like based on the values of normal pixels surrounding the defective pixels. After the correction, for example, the group of pixels in the processing memory 21 is substituted for the corresponding data of the digital image stored in the image storage 1.

Next, an operation of the above apparatus will be described in detail with reference to the flowchart shown in FIG. 4 and the schematic views of a digital image shown in FIGS. 5 through 10.

Step S1 (display digital image)

The operator selects, through the keyboard 7 or mouse 9, a desired digital image from among the numerous digital images stored in the image storage 1. The controller 3 outputs the selected digital image to the monitor 5 to be displayed thereon. For simplicity of description, it is assumed that a digital image F of 19×19 dots as shown in FIG. 5 is displayed on the monitor 5.

Figure 5:
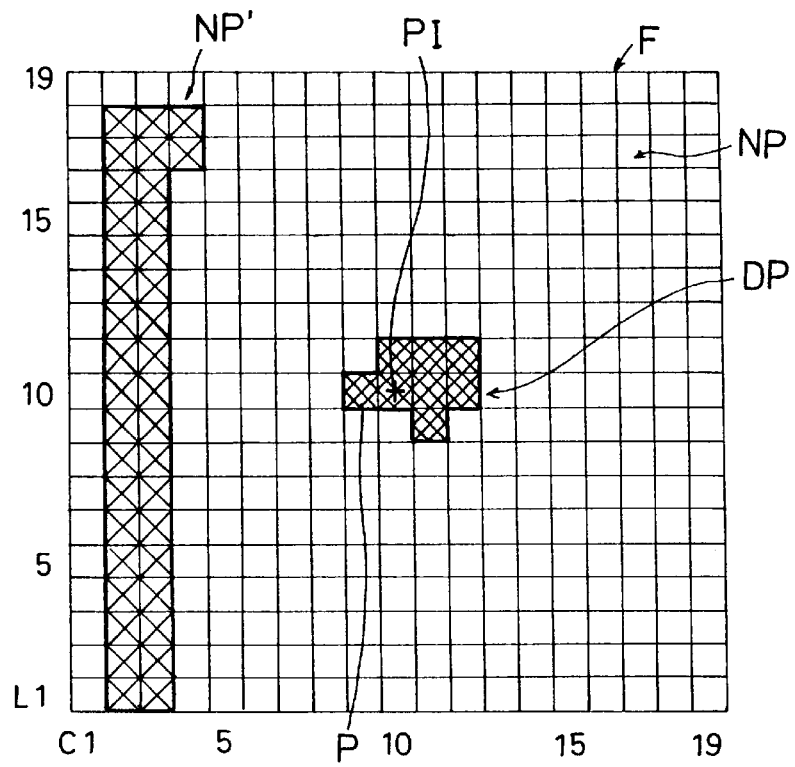
FIG. 5 is a schematic view of a digital image.

In FIG. 5, references L1 to L19 written in the vertical direction denote rows of pixels arranged horizontally, while references C1 to C19 written in the horizontal direction denote columns of pixels arranged vertically. The digital image F includes a group of normal pixels NP' having relatively dark values in a left portion thereof, and a group of defective pixels DP having dark values in a central portion thereof. The other pixels form a group of normal pixels NP having light values. In the following description, those pixels unknown to be normal or defective will be called simply pixels P. Wherever necessary, their positions will be expressed by using, as placed in parentheses, the references L1 to L19 representing the rows of pixels, and the references C1 to C19 representing the columns of pixels. For example, the pixel located in the upper left corner of the normal pixel group NP in FIG. 5 will be expressed as P(L19, C1).

Step S2 (designate defective pixel)

The operator, while observing the digital image F displayed on the monitor 5, recognizes the defective pixel group DP in relation to the values of surrounding pixels, for example. Then, the operator designates, with the mouse 9, either one of pixels P(L9, C11), P(L10, C9), P(L10, C10), P(L10, C10), P(L10, C12), P(L11, C10), P3(L11, C11) and P(L11, C12). It is assumed here that pixel P(L10, C11) in the center of the image is designated. This pixel will be called PI as appropriate. As will be apparent from the following description, it is not absolutely necessary to designate one of the defective pixels, but a normal pixel lying adjacent the defective pixels may be designated.

Step S2 corresponds to step (a) and process (a) of this invention.

Step S3 (display evaluation area)

Figure 6:
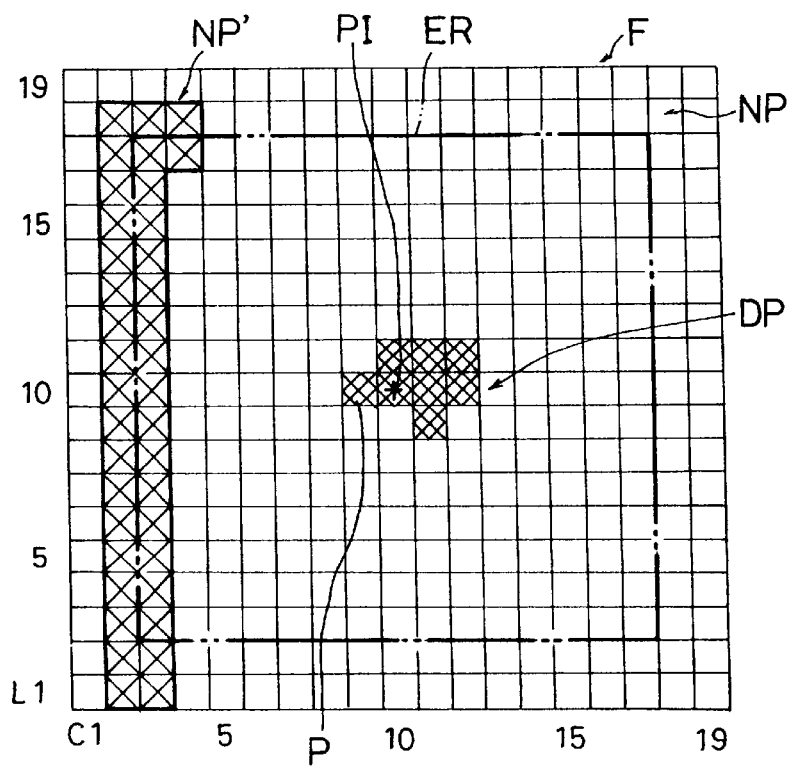
FIG. 6 is a schematic view showing an evaluation area in the digital image.

The evaluation area setter 19 refers to the area size (15×15 dots) stored in the area storage 17, and outputs this information to the controller 3. As shown in FIG. 6, the controller 3 causes the monitor 5 to display, as superposed on the digital image F, a rectangular frame corresponding to the area size and centering on the pixel PI designated. Further, the evaluation area setter 19 sets, as an evaluation area ER, the group of pixels P included in the rectangular frame (i.e. the group of pixels in the rectangle having pixel P(L3, C3) and pixel P(L17, C17) diagonally opposed to each other) among the pixels in the digital image F, and transfers the pixel group included in the evaluation area ER to the processing memory 21. The pixel group transferred includes a right portion of the normal pixel group NP' having relatively dark values, the defective pixel group DP and the normal pixel group NP.

Step S3 corresponds to step (b) and process (b) of this invention.

Step S4 (set defective pixel candidate)

Figure 7:
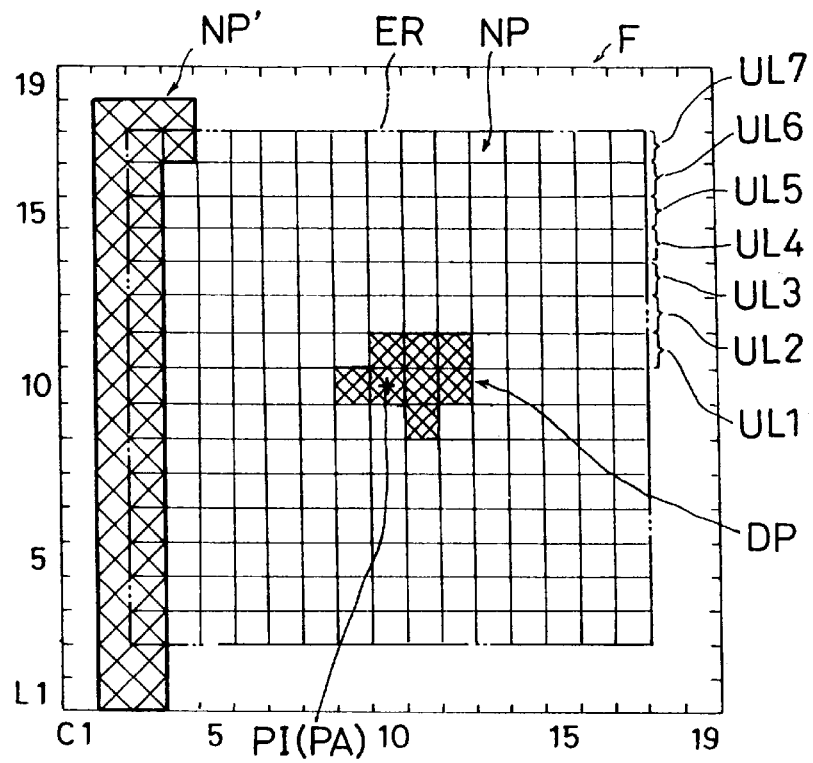
FIG. 7 is a schematic explanatory view showing a step of limiting the evaluation area.

As shown in FIG. 7, the defective pixel candidate setter 23 sets, as a defective pixel candidate PA, the pixel having the darkest value in a central portion of the pixel group stored in the process memory 21, i.e. the pixel group in the evaluation area ER. The central portion is, for example, a rectangular range of 2×2 dots centering on the pixel PI designated. In this example, a plurality of [defective] pixels lying in the central portion have substantially the same value, and any one of them may be set as the defective pixel candidate. It is assumed here that the pixel PI designated by the operator is given priority and set as defective pixel candidate PA. This setting causes no inconvenience since the operator usually recognizes defective pixels and designates one of them.

Step S4 corresponds to step (c) and process (c) of this invention.

Step S5 (compute line averages)

The line average computing unit 25 refers to the pixels in the evaluation area ER, and computes an average of pixel values on each of upper lines of pixels arranged horizontally above the defective pixel candidate PA, i.e. seven upper lines UL1–UL7, as shown in FIG. 7, which lie between the defective pixel candidate PA and the upper edge of the evaluation area ER. The average is computed as a line average. The upper line UL1 includes three defective pixels having dark values in an intermediate portion thereof, and a normal pixel NP' having a relatively dark value at the left end thereof. Thus, the upper line UL1 has the smallest average value. The upper line UL7 includes two normal pixels NP' having relatively dark values at the left end thereof, and therefore has the smallest average value after the upper line UL1. The upper lines UL2–UL6 each include only one normal pixel NP' having a relatively dark value at the left end thereof, and therefore have the largest average value.

Figure 8:
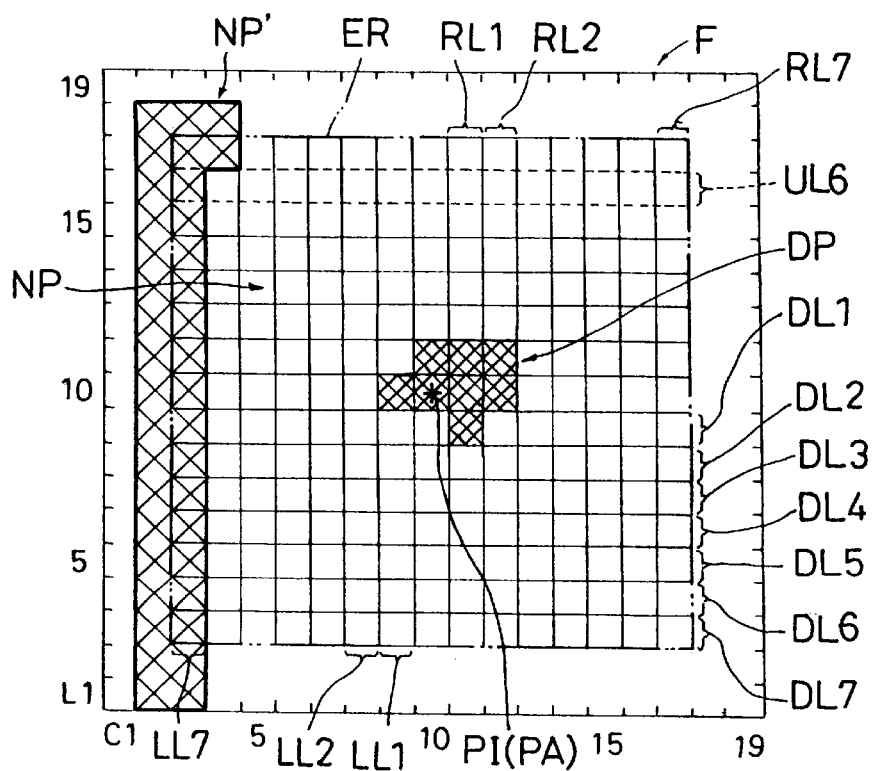
FIG. 8 is another schematic explanatory view showing the step of limiting the evaluation area.

Next, as shown in FIG. 8, an average of pixel values on each of lower lines DL1–DL7 of pixels arranged horizontally below the defective pixel candidate PA is computed as a line average. In this case, the lower line DL1 has the smallest average value, and the lower lines DL2–DL7 have larger average values than the lower line DL1.

Similarly, an average of pixel values on each of left lines LL1–LL7 and right lines RL1–RL7 of pixels arranged vertically at the left and right sides of the defective pixel candidate PA is computed as a line average. In this case, the left line LL7 has the smallest average value, the left line LL1 has the second smallest average value, the left line LL6 has the next smallest average value after the left line LL1, and the left lines LL2–LL5 have the largest average value. As for the right lines, the average values become larger in the order from right line RL1 to right line RL2 and to right lines RL3–RL7.

Step S5 corresponds to step (d) and process (d) of this invention.

Step S6 (limit evaluation area)

The area limiting unit 27 refers to the line averages in the upper, lower, right and left directions computed by the line average computing unit 25, and selects a line having the lightest line average in each direction. The lightest line average means the largest line average with respect to the relationship between light/dark and pixel value. That is, in this example, the five upper lines UL2–UL6, six lower lines DL2–DL7, four left lines LL2–LL5 and five right lines RL3–RL7 have the largest line averages in the respective directions. In this case, the line remotest from the defective pixel candidate PA is selected in each direction for the reason described hereinafter. That is, upper line UL6 is selected from the upper lines, lower line DL7 from the lower lines, left line LL5 from the left lines, and right line RL7 from the right lines. As a result of this process, the evaluation area ER set first is diminished toward the defective pixel candidate PA (see FIG. 9). By diminishing the evaluation area ER in this way, part of the normal pixels NP' lying in the left portion of the evaluation area ER may be excluded from the subsequent processes.

Step S6 corresponds to step (e) and process (e) of this invention.

Step S7 (compute threshold)

Figure 9:
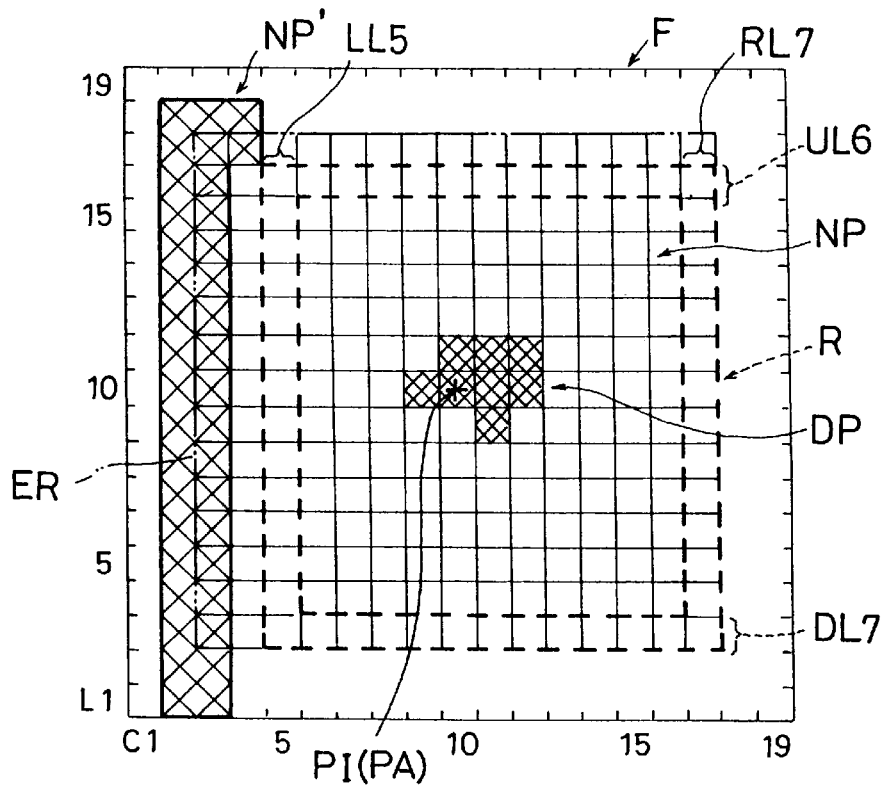
FIG. 9 is a schematic view of a diminished evaluation area.

As shown in FIG. 9, the threshold computing unit 29 computes a threshold value from the pixels forming a rectangular frame R defined by the upper line UL6, lower line DL7, left line LL5 and right line RL7. The threshold value is derived from the equation threshold $T = A - S \times C$, where A is an average pixel value of the rectangular frame R, S is a distribution of the pixel values through the rectangular frame R, and C is a constant. Distribution S is subtracted from the average pixel value A of the rectangular frame R in order to prevent the normal pixels from being recognized as defective pixels by taking account of variations in the normal pixels included in the rectangular frame R. Distribution S is multiplied by constant C on empirical grounds, and constant C preferably has a value of 2 to 3.

Step S7 corresponds to step (f) and process (f) of this invention.

The following is the reason for computing the threshold value T from the pixels forming the rectangular frame R rather than the area enclosed by the lines UL6, DL7, LL5 and RL7. The area defined by these lines includes therein a mixture of defective pixels DP, including the defective pixel candidate PA, and normal pixels NP. It would therefore be impossible to distinguish accurately between defective pixels DP and normal pixels NP by computing threshold value T from the pixel values within the rectangular frame R. Thus, threshold value T is computed from the average pixel value A of the rectangular frame R which includes only normal pixels NP having lighter values than defective pixels DP (which frame is defined by the rows and columns of pixels having the lightest values).

Step S8 (discriminate defective pixels)

The defective pixel discriminating unit 31 compares the threshold value T with all the pixel values within the rectangular frame R, and determines all pixels having darker (smaller) values than the threshold value T to be defective pixels. That is, in FIG. 9, the threshold value T is compared with the values of all pixels forming a rectangle having pixel P(L4, C6) and pixel P(L15, C16) diagonally opposed to each other.

Step S8 corresponds to step (g) and process (g) of this invention.

As noted above, threshold value T is determined based on the average pixel value A of the rectangular frame R which includes only normal pixels, and defective pixels are identified only among the pixels lying within the frame R diminished from the evaluation area ER. Thus, even where the evaluation area ER includes normal pixels NP' having dark values, these pixels, if lying away from the pixel PI designated by the operator, are never mistaken for defective pixels. Only the defective pixels are correctly identified as such. The operator has only to designate a single spot close to the defective pixels first. In this way, the defective pixels may be identified with the least effort of the operator.

Step S9 (correct defective pixels)

The defective pixel correcting unit 33 corrects each of the defective pixels identified by the defective pixel discriminating unit 31. For example, the value of defective pixel DP(L10, C9) is replaced with a value computed by linear interpolation from normal pixel NP(L11, C9) and normal pixel NP(L9, C9). A similar corrective operation is carried out for each of the other defective pixels DP. The data in the processing memory 21 are rewritten with new data acquired in this way. The new data in the processing memory 21 are used to correct the original digital image stored in the image storage 1. Since the defective pixels are accurately identified as noted above, the correcting operation assures high quality without deteriorating the texture of the digital image.

A supplemental description of step S6 will be made hereinafter.

Figure 10:
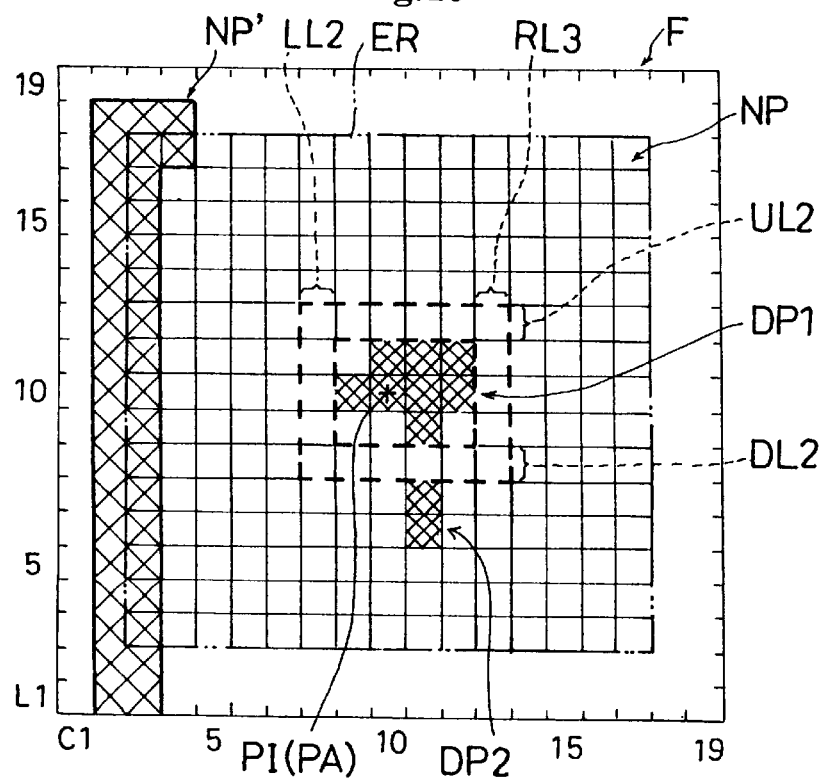
FIG. 10 is a schematic explanatory view showing an inconvenience likely to occur when limiting the evaluation area.

Step S6 is executed to diminish the evaluation area ER as illustrated in FIGS. 7 through 9. Where a plurality of lightest lines exist in each direction, a question arises as to which line should be selected. With a view to diminishing the evaluation area ER, it would seem desirable to select the line nearest to the defective pixel candidate PA. Assume that, as shown in FIG. 10, the evaluation area ER includes a defective pixel group DP1 and a defective pixel group DP2 lying separately from each other. Assuming that the line nearest to the defective pixel candidate PA is selected from among the lightest lines in each direction, such lines selected will be upper line 1JL2, lower line DL2, left line LL2 and right line RL3. However, as seen from FIG. 10, the defective pixel group DP2 will then be excluded from the area defined by these lines. To avoid such an inconvenience, the lines remotest from the defective pixel candidate PA should be selected.

Figure 11:
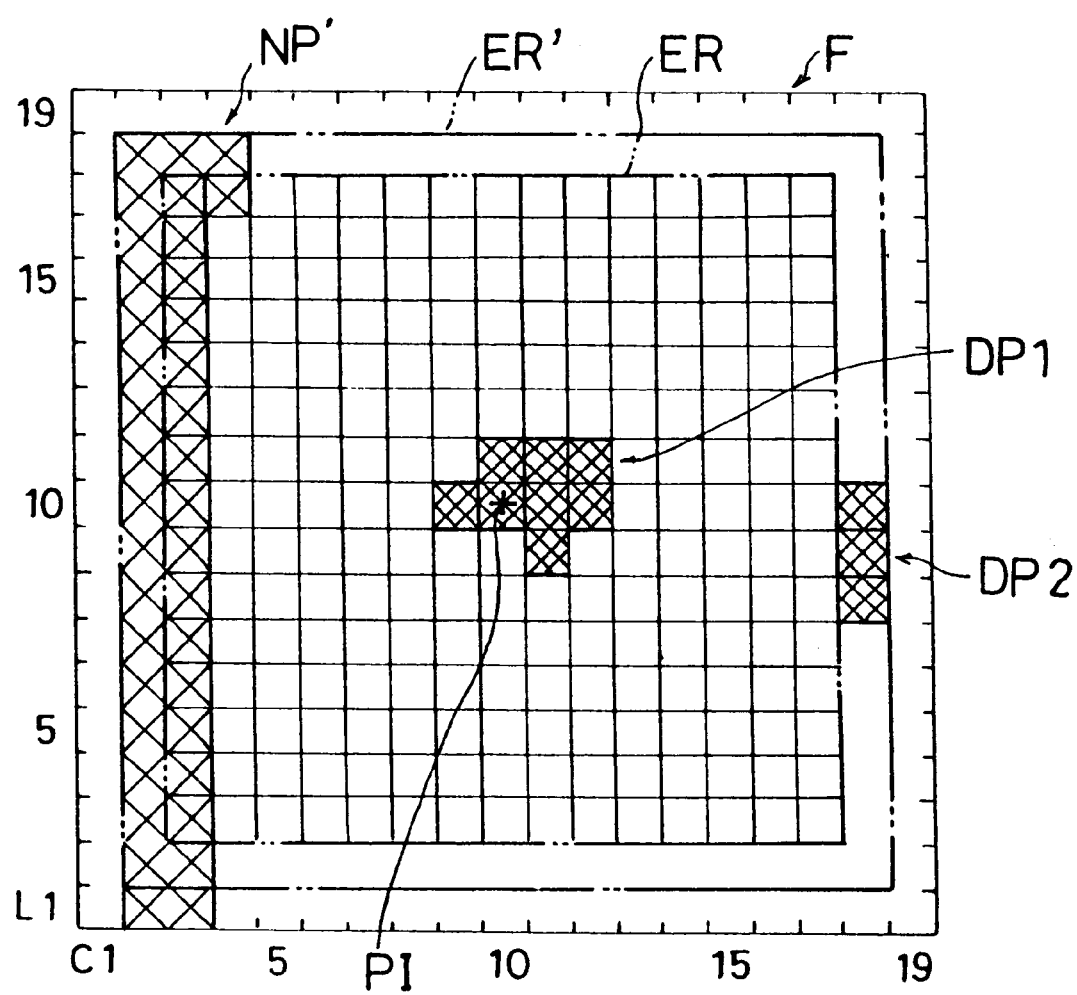
FIG. 11 is a schematic explanatory view showing a case where the size of the evaluation area should desirably be changed.

The area storage 17 stores an area size inputted thereto in advance, which determines the size of evaluation area ER. An example where it is desirable to change the area size will be described with reference to FIG. 11.

A digital image F may include a defective pixel group DP1 in a central portion thereof, and a defective pixel group DP2 in a portion away to the right. The defective pixel group DP2 will be excluded from the evaluation area ER if the operator designates the same pixel PI as described hereinbefore. In this case, the foregoing process may be repeated by designating a spot adjacent the defective pixel group DP2. However, it will be more efficient to vary the value stored in the area storage 17 by operating the keyboard 7 or mouse 9, since this will allow the two defective pixel groups DP1 and DP2 to be identified in one designating operation. In this example, the area size of 15×15 dots stored in the area storage 17 should be changed to a value of 16×16 dots or larger. It is desirable to change the area size also in the event of an extremely large defective pixel group such as one exceeding the area size. Conversely, in the case of a small defective pixel group, an excessive number of adjacent normal pixels could be included in the evaluation range. In that case, the area size should be reduced.

The operator usually knows whether a group of defective pixels of a certain size fits into the evaluation area ER or not. It is therefore desirable to change the area size according to a form of defective pixels before step S2 (designate defective pixel), i.e. when the operator recognizes a size of defective pixels in the digital image displayed on the monitor 5 at step S1 (display digital image). This enables identification of defective pixels in various forms, and hence a proper correction thereof. Changing the area size is not limited to the time of step S1, but the area size may be changed when a defective pixel is designated at step S2. Further, the area size may be changed after confirming a positional relationship between the evaluation area and defective pixels when the evaluation area is superposed on the digital image at step S3 (display evaluation area).

To facilitate understanding, the foregoing embodiment has been described, taking a digital image in black-and-white tones for example. However, color digital images are processed more frequently in practical situations. A color image may be processed as described hereinbefore after converting it into a grayscale image, as in grayscale information=(R+G+B)/3. Caused by dirt or dust, defective pixels having a high degree of saturation are extremely rare indeed. Thus, the above processing results in no inconvenience.

Figure 4:
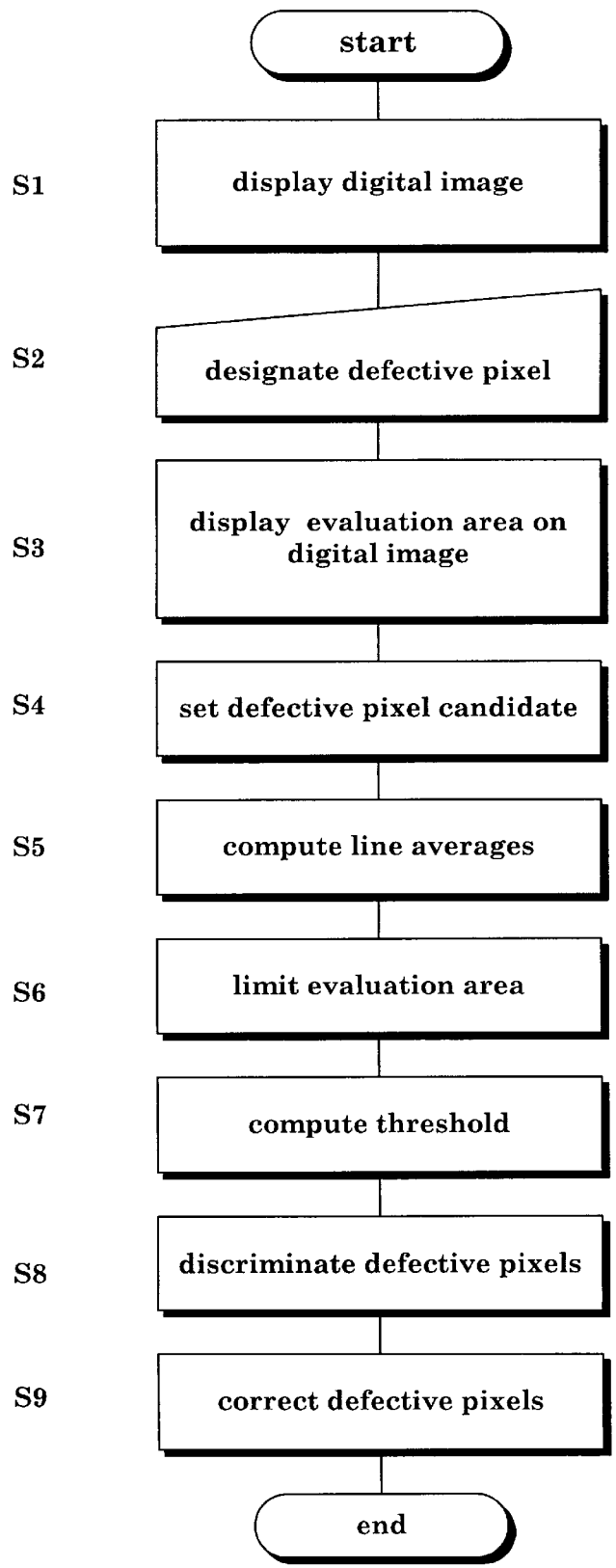
FIG. 4 is a flowchart of an operation of the image processing apparatus.

Steps S2–S8 shown in the flowchart of FIG. 4 correspond to the program of identifying defective pixels according to this invention, which is stored in the recording medium M. A computer having a construction different from what is shown in the block diagram of FIG. 3 may, by executing the program read from the recording medium M, produce the same effects as the apparatus having the described construction.

Second Embodiment

Figure 12:
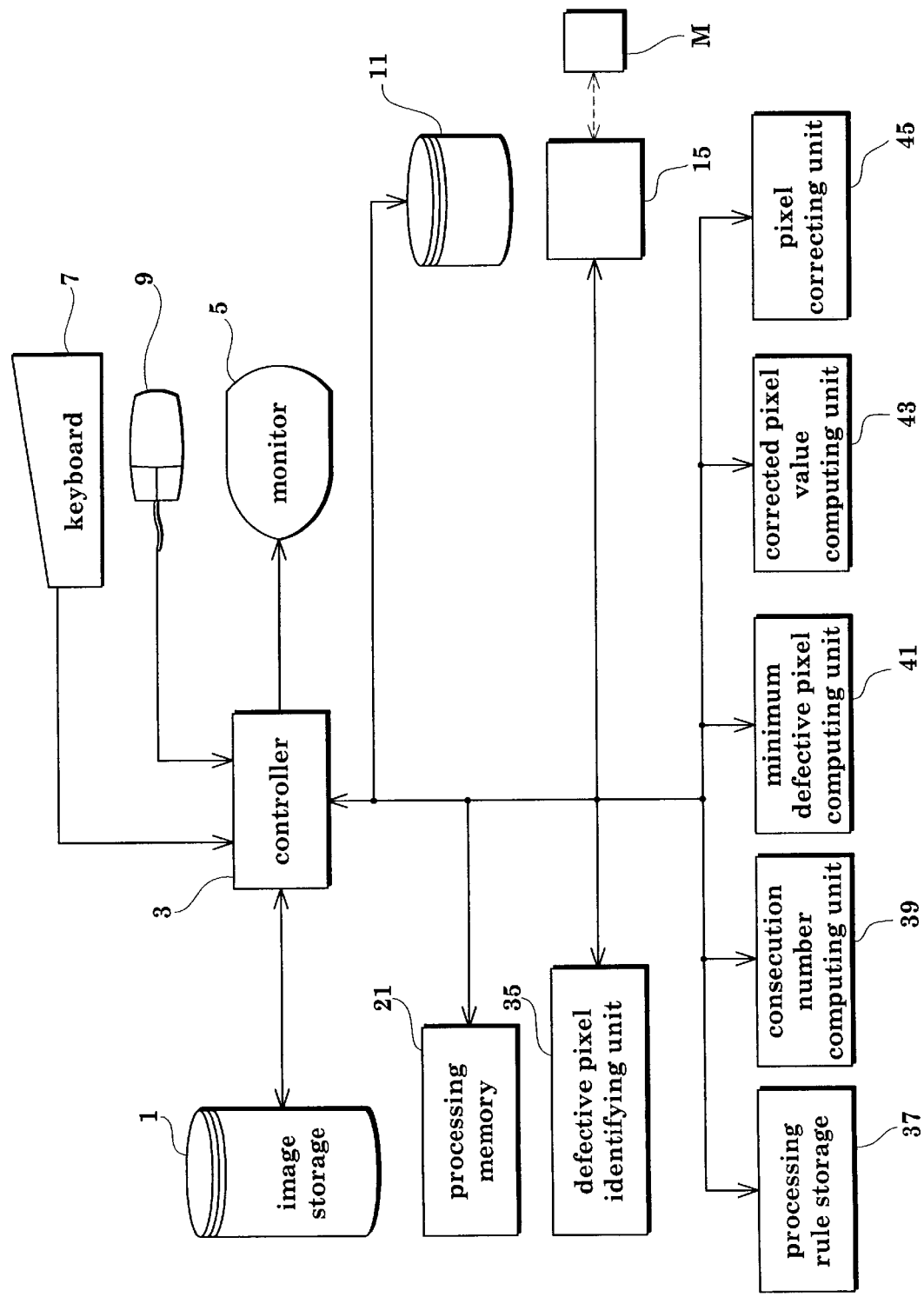
FIG. 12 is a block diagram of an image processing apparatus for executing a method of correcting defective pixels in a second embodiment of this invention.

FIG. 12 is a block diagram of an image processing apparatus for performing image processing including a method of correcting defective pixels in a digital image according to this invention. Parts identical to those of the first embodiment (FIG. 3) are shown with the same reference numerals, and will not be described again. As in the first embodiment, the processes based on a program described hereinafter are also presented functionally in the block diagram to facilitate understanding.

A defective pixel identifying unit 35 corresponding to the defective pixel identifying device has a function to identify defective pixels included in a digital image selected by the operator. An outline of this process will be described briefly hereunder.

The operator recognizes defective pixels in the digital image, and designates one of the defective pixels or a pixel adjacent thereto through the mouse 9, for example. An evaluation area is set around the pixel designated. The evaluation area is diminished based on the values of normal pixels included in the evaluation area. A threshold value is set based on pixel values of a rectangular frame defining the diminished area. Values of all pixels in the diminished area are compared with the threshold value to identify the defective pixels. Positions (e.g. rows and columns representing positions) of the defective pixels identified are stored as defective pixel information in the defective pixel identifying unit 35.

The processing memory 21 receives and stores the group of pixels included in the evaluation area, identified by the defective pixel identifying unit 35 and transferred by the controller 35. The group of pixels stored in the processing memory 21 is referred to and rewritten by the varied units described hereinafter.

As particularly described hereinafter, when correcting the defective pixels, the number of defective pixels consecutive in the direction across the rows (vertical direction) and the number of defective pixels consecutive in direction across the columns (horizontal direction) are determined in respect of each defective pixel, and the correction is started with a defective pixel having a minimum consecution number. A processing rule storage 37 stores rules inputted thereto in advance, including rules for determining which defective pixel should be processed with priority when a plurality of defective pixels have the same consecution number. These rules may be inputted, as appropriate, by the operator through the keyboard 7 and/or mouse 9. In this embodiment, the rules are set such that priority is given to an upper defective pixel when a plurality of defective pixels having the same consecution number are found in the direction across the rows, and to a left defective pixel when a plurality of defective pixels having the same consecution number are found in the direction across the columns. In successively correcting the defective pixels having minimum consecution numbers, a defective pixel may have minimum consecutive numbers in both the direction across the rows and the direction across the columns. Then, there arises a question as to which direction should be chosen for an interpolation based on normal pixels. According to a rule set for such a case, the directions of correction are switched alternately from one defective pixel to another. That is, after a correction based on normal pixels arranged in the direction across the rows, a next correction is made based on normal pixels in the direction across the columns.

A consecution number computing unit 39 corresponding to the consecution number computing device of this invention refers to the processing memory 21, and computes, for each defective pixel, the number of defective pixels consecutive in the direction across the columns (horizontal direction) as a consecution number in the direction across the columns, and the number of defective pixels consecutive in the direction across the rows (vertical direction) as a consecution number in the direction across the rows. A minimum defective pixel computing unit 41 computes a minimum consecution number from the consecution numbers in the direction across the columns and the consecution numbers in the direction across the rows computed by the consecution number computing unit 39. The minimum defective pixel computing unit 41 also has a function to determine the defective pixel having the minimum consecution number to be a minimum defective pixel. When a plurality of minimum defective pixels are found, the minimum defective pixel computing unit 41 refers to the processing rule storage 37, and determines a minimum defective pixel according to a rule stored therein.

The minimum defective pixel computing unit 41 corresponds to the minimum defective pixel computing device of this invention.

A corrected pixel value computing unit 43 computes a corrected pixel value of the minimum defective pixel, based on the values of normal pixels arranged across the minimum defective pixel in the direction of the minimum consecution number of the minimum defective pixel. In this example, the corrected pixel value is computed by linear interpolation (insertion) from the values of two normal pixels opposed to each other across the minimum defective pixel. Various other interpolating techniques are available for computing the corrected pixel value, e.g. spline interpolation and Lagrangian interpolation. While the corrected pixel value is computed by linear interpolation in this embodiment, one of the other interpolating techniques may be used, depending on positions of the defective pixels in the digital image, for example.

The corrected pixel value computing unit 43 corresponds to the corrected pixel value computing device of this invention.

A pixel correcting unit 45 corresponding to the pixel correcting device substitutes the corrected pixel value computed, for the value of the minimum defective pixel. Specifically, the corrected pixel value is substituted for the value of the defective pixel corresponding to the minimum defective pixel among the pixels in the evaluation area stored in the processing memory 21. The defective pixel information corresponding to the corrected minimum defective pixel is deleted from the defective pixel identifying unit 35. The controller 3 repeatedly controls the consecution number computing unit 39, minimum defective pixel computing unit 41, corrected pixel value computing unit 43 and pixel correcting unit 45 until the defective pixel identifying unit 35 becomes devoid of defective pixel information.

Next, an operation of the above apparatus will be described with reference to the flowchart shown in FIG. 13 and the schematic views of a digital image shown in FIGS. 14 through 24.

Step S11 (display digital image)

Figure 14:
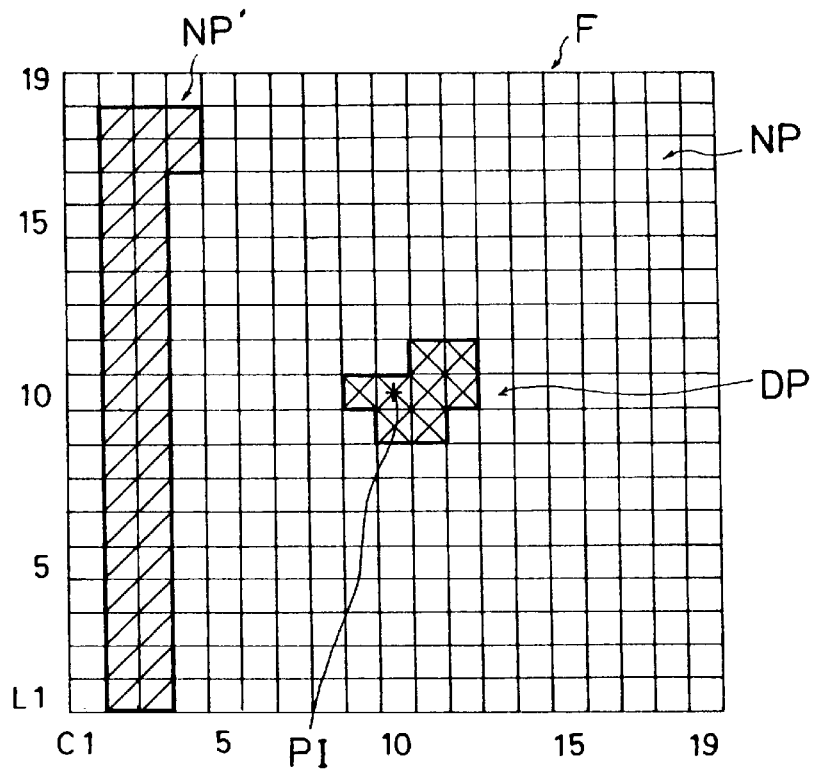
FIG. 14 is a schematic view of a digital image.

The operator selects, through the keyboard 7 or mouse 9, a desired digital image from the image storage 1. The controller 3 outputs the selected digital image to the monitor 5 to be displayed thereon. Assume that the digital image is displayed as schematically shown in FIG. 14. As seen, the digital image F includes normal pixels NP properly converted from an original image, and defective pixels (marked with "X" signs) not properly converted owing to dirt or dust. The digital image F further includes normal pixels NP' (marked with "/" signs) having relatively dark values (e.g. from a dark wall or shadow) in a left portion thereof.

For simplicity of description, it is assumed that the digital image F displayed includes 19×19 dots. In FIG. 14, references L1 to L19 written in the vertical direction denote rows of pixels arranged in the direction across columns (i.e. horizontally) along which the number of columns varies, while references C1 to C19 written in the horizontal direction denote columns of pixels arranged in the direction across the rows (i.e. vertically) along which the number of rows varies. In the following description, those pixels unknown to be normal or defective will be called simply pixels P. Wherever necessary, their positions will be expressed by using, as placed in parentheses, the references L1 to L19 representing the rows of pixels, and the references C1 to C19 representing the columns of pixels. For example, the pixel located in the upper left corner of the normal pixel group NP in FIG. 14 will be identified as P(L19, C1).

Step S12 (identify defective pixels: corresponding to step (a) and process (a)) The operator, while observing the digital image F displayed on the monitor 5, recognizes the defective pixel group DP in relation to the values of surrounding pixels, for example. Then, the operator designates, with the mouse 9, either one of pixels P(L9, C10), P(L9, C11), P(L10, C9), P(L10, C10), P(L10, C10), P(L10, C12), P(L11, C11) and P(L11, C12). It is assumed here that pixel P(L10, C10) in the center of the image is designated. This pixel will be called PI as appropriate. For the reason set out hereinafter, it is not absolutely necessary to designate a defective pixel, but a normal pixel lying adjacent the defective pixels may be designated.

Figure 15:
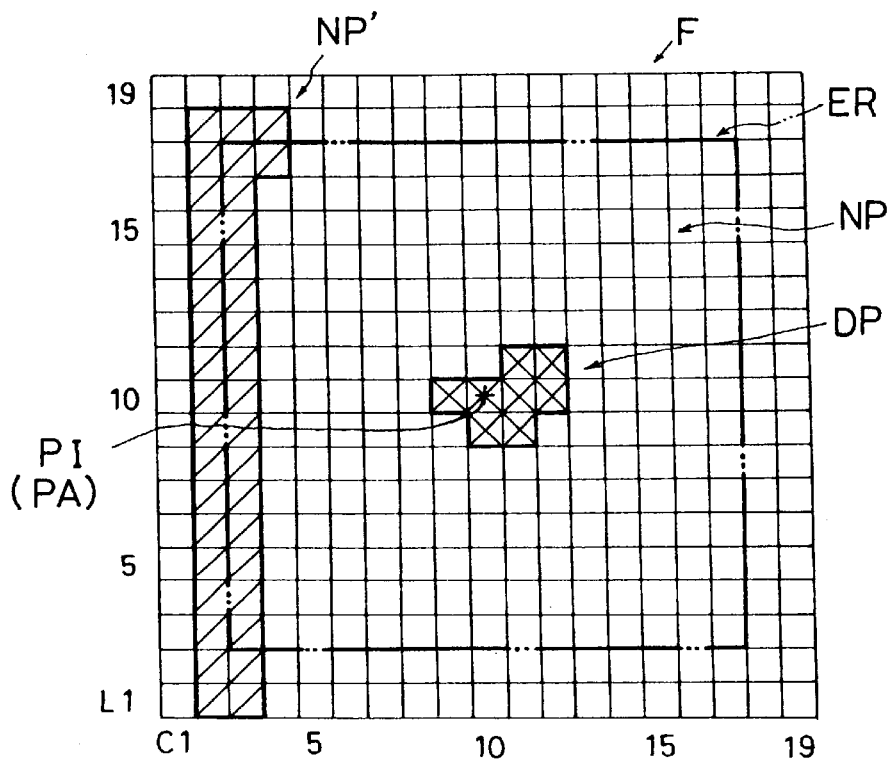
FIG. 15 is a schematic view showing an evaluation area in the digital image.

As shown in FIG. 15, the defective pixel identifying unit 35 causes a rectangular frame centering on the pixel PI designated and having an area size (15×15 dots) stored in advance to be displayed on the monitor 5 as superposed on the digital image F. The group of pixels P included in the rectangular frame (i.e. the group of pixels in the rectangle having pixel P(L3, C3) and pixel P(L17, C17) diagonally opposed to each other) among the pixels in the digital image F is set as an evaluation area ER. The pixel group included in the evaluation area ER is transferred to the processing memory 21. The pixel group transferred includes a right portion of the normal pixel group NP' having relatively dark values, the defective pixel group DP and the normal pixel group NP.

Figure 16:
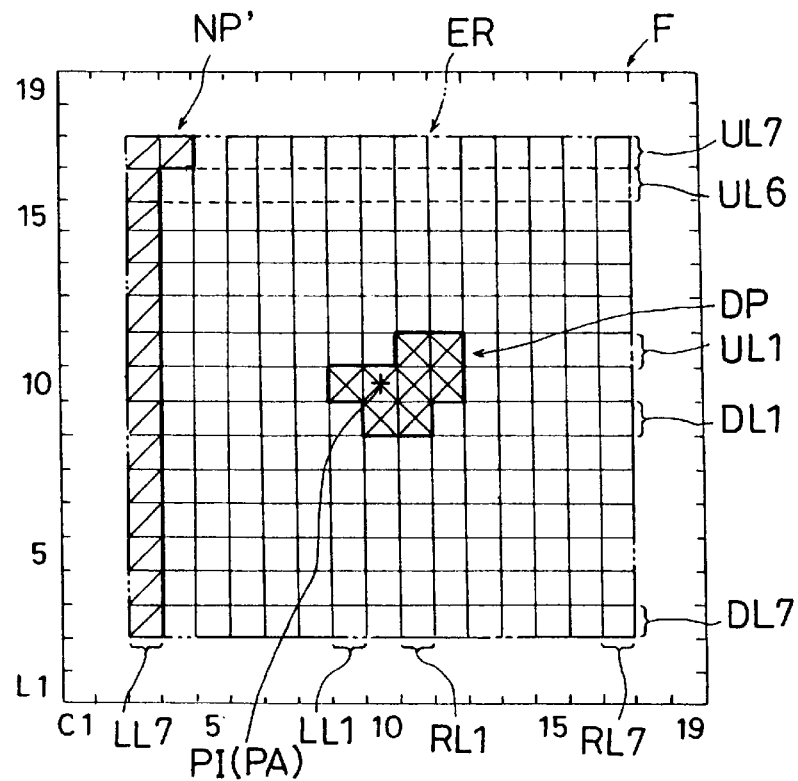
FIG. 16 is a schematic explanatory view showing a step of limiting the evaluation area.

Next, as shown in FIG. 16, the pixel having the darkest value in a central portion of the pixel group in the evaluation area ER stored in the process memory 21 is set as a defective pixel candidate PA, The central portion is, for example, a rectangular range of 2×2 dots centering on the pixel PI designated. In this example, a plurality of [defective] pixels lying in the central portion have substantially the same value, and any one of them may be set as the defective pixel candidate. It is assumed here that the pixel PI designated by the operator is given priority and set as defective pixel candidate PA. This setting causes no inconvenience since the operator usually recognizes defective pixels and designates one of them.

Among the pixels in the evaluation area ER, pixels arranged horizontally above the defective pixel candidate PA form seven upper lines UL1–UL7 as shown in FIG. 16, which lie between the defective pixel candidate PA and the upper edge of the evaluation area ER. An average of pixel values on each of these upper lines is computed as a line average. The upper line UL1 has the smallest average value. The upper line UL7 has the next smallest average value after the upper line UL1. The upper lines UL2–UL6 have the largest average value.

Similarly, an average of pixel values on each of lower lines DL1–DL7 below the defective pixel candidate PA is computed as a line average. In this case, the lower line DL1 has the smallest average value, and the lower lines DL2–DL7 have larger average values than the lower line DL1. Further, an average of pixel values on each of left lines LL1–LL7 and right lines RL1–RL7 at the left and right sides of the defective pixel candidate PA is computed as a line average. In this case, the left line LL7 has the smallest average value, the left line LL1 has the second smallest average value, the left line LL6 has the next smallest average value after the left line LL1, and the left lines LL2–LL5 have the largest average value. As for the right lines, the average values become larger in the order from right line RL1 to right line RL2 and to right lines RL3–RL7.

By referring to the line averages in the upper, lower, right and left directions computed, a line having the lightest line average in each direction is selected. The lightest line average means the largest line average with respect to the relationship between light/dark and pixel value. That is, in this example, the five upper lines UL2–UL6, six lower lines DL2–DL7, four left lines LL2–LL5 and five right lines RL3–RL7 have the largest line averages in the respective directions. In this case, the line remotest from the defective pixel candidate PA is selected in each direction in order to embrace all of the defective pixels. That is, upper line UL6 is selected from the upper lines, lower line DL7 from the lower lines, left line LL5 from the left lines, and right line RL7 from the right lines. As a result of this process, the evaluation area ER set first is diminished toward the defective pixel candidate PA (see FIG. 17). By diminishing the evaluation area ER in this way, part of the normal pixels NP' lying in the left portion of the evaluation area ER may be excluded from the subsequent processes.

Figure 17:
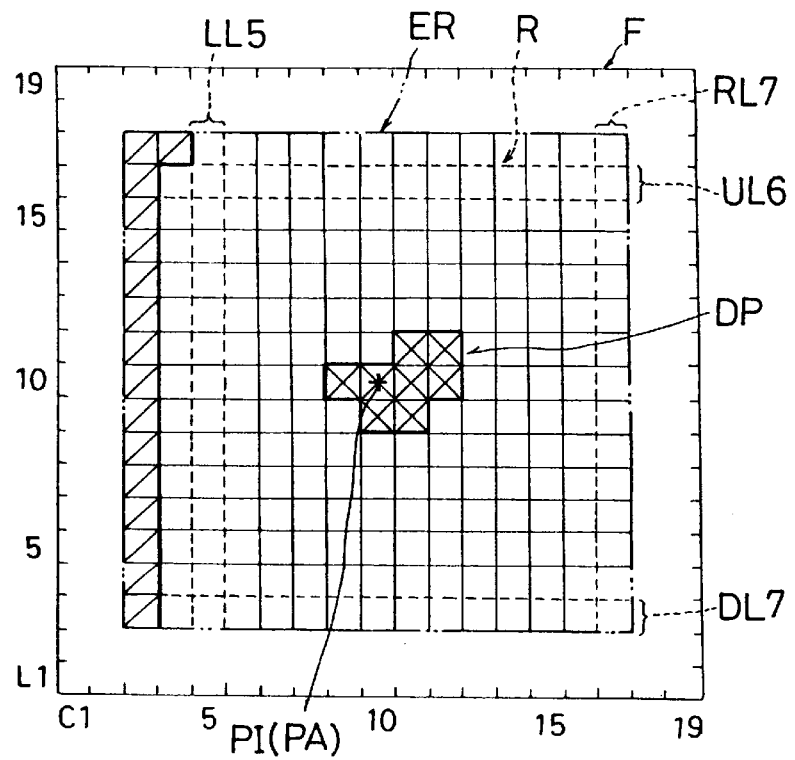
FIG. 17 is another schematic explanatory view showing the step of limiting the evaluation area.

Next, a threshold value is computed from the pixels forming a rectangular frame R shown in FIG. 17. The threshold value is derived from the equation threshold T=A−S×C, where A is an average pixel value of the rectangular frame R, S is a distribution of the pixel values through the rectangular frame R, and C is a constant. Distribution S is subtracted from the average pixel value A of the rectangular frame R in order to prevent the normal pixels from being recognized as defective pixels, by taking account of variations in the normal pixels included in the rectangular frame R. Distribution S is multiplied by constant C on empirical grounds, and constant C preferably has a value of 2 to 3.

The following is the reason for computing the threshold value T from the pixels forming the rectangular frame R rather than the area enclosed by the lines UL6, DL7, LL5 and RL7. The area defined by these lines includes therein a mixture of defective pixels DP, including the defective pixel candidate PA, and normal pixels NP. It would therefore be impossible to distinguish accurately between defective pixels DP and normal pixels NP by computing threshold value T from the pixel values within the rectangular frame R. Thus, threshold value T is computed from the average pixel value A of the rectangular frame R which includes only normal pixels NP having lighter values than defective pixels DP.

The threshold value T computed is compared with all the pixel values within the rectangular frame R, and all pixels having darker (smaller) values than the threshold value T are determined to be defective pixels. That is, in FIG. 17, the threshold value T is compared with the values of all pixels forming a rectangular frame having pixel P(L4, C6) and pixel P(L15, C16) diagonally opposed to each other.

As noted above, threshold value T is determined based on the average pixel value A of the rectangular frame R which includes only normal pixels, and defective pixels are identified only among the pixels lying within the frame R diminished from the evaluation area ER. Thus, even where the evaluation area ER includes normal pixels NP' having dark values, these pixels, if lying away from the pixel PI designated by the operator, are never mistaken for defective pixels. Only the defective pixels are correctly identified as such. The operator has only to designate a single spot close to the defective pixels first. In this way, the defective pixels may be identified with the least effort of the operator.

Figure 18:
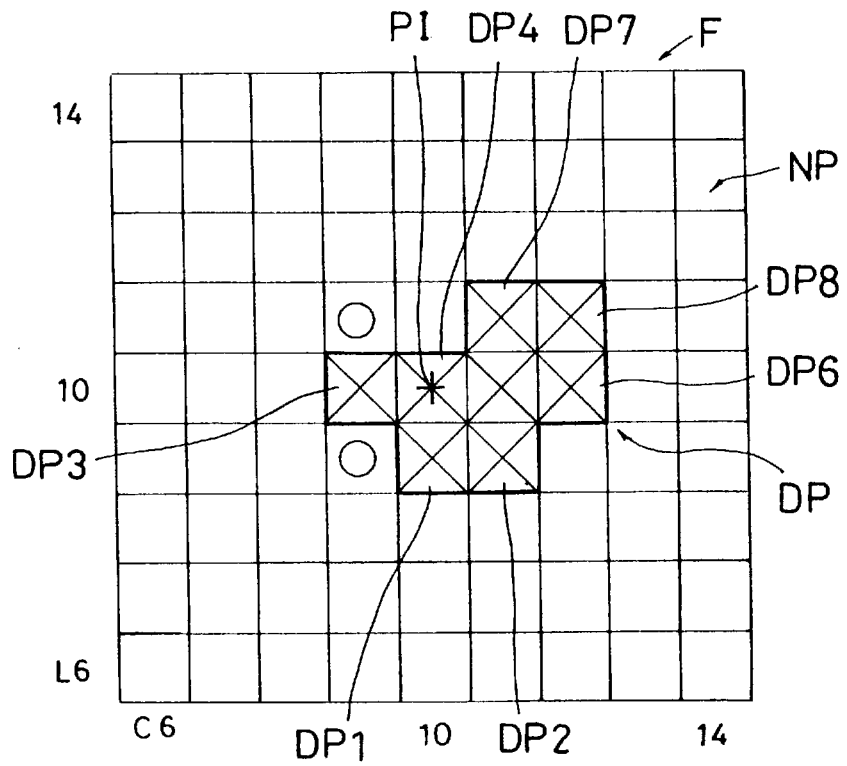
FIG. 18 is a schematic view showing a step of correcting defective pixels.

As a result of the above process, the following defective pixel information is stored in the defective pixel identifying unit 35. To clarify the defective pixels identified, FIG. 18 shows the digital image F in enlargement, along with the following references:

defective pixels
DP1(L9, C10)
DP2(L9, C11)
DP3(L10, C9)
DP4(L10, C10)
DP5(L10, C11)
DP6(L10, C12)
DP7(L11, C11)
DP8(L11, C12)

Step S13 (compute consecution numbers: corresponding to step (b) and process (b))

The consecution number computing unit 39 refers to the processing memory 21, and computes, for each of the eight defective pixels DP1–DP8 identified through the above processing, the number of defective pixels, including itself, consecutive in the direction across the rows as a consecution number in the direction across the rows, and the number of defective pixels, including itself, consecutive in the direction across the columns as a consecution number in the direction across the columns. The consecution numbers, in the direction across the rows and those in the direction across the columns, of the respective defective pixels DP1–DP8 are as follows:

| defect. pixels | con. numbers across rows | con. numbers across columns |
| --- | --- | --- |
| DP1(L9, C10) | 2 | 2 |
| DP2(L9, C11) | 3 | 2 |
| DP3(L10, C9) | 1 | 4 |
| DP4(L10, C10) | 2 | 4 |
| DP5(L10, C11) | 3 | 4 |
| DP6(L10, C12) | 2 | 4 |
| DP7(L11, C11) | 3 | 2 |
| DP8(L11, C12) | 2 | 2 |

Step S14 (determine minimum defective pixel: corresponding to step (c) and processing (c))

The minimum defective pixel computing unit 41 determines a defective pixel having the smallest consecution number in the direction across the rows and in the direction across the columns among the defective pixels DP1–DP8. In this example, defective pixel DP3(L10, C9) having consecution number "1" in the direction across the rows is determined to be a minimum defective pixel DP3. Among the defective pixels DP1–DP8, this minimum defective pixel DP3 is sandwiched between two normal pixels NP through the shortest distance.

Step S15 (compute corrected pixel value: corresponding to step (d) and processing (d))

The corrected pixel value computing unit 43 computes a corrected value of defective pixel DP3(L10, C9). Since the defective pixel DP3 has the smallest consecution number in the direction across the rows, the corrected pixel value is computed by linear interpolation from the values of two normal pixels NP(L11, C9) and NP(L9, C9) opposed to each other across the minimum defective pixel DP3, which are marked with circles in FIG. 18. Since the corrected pixel value is computed by using the two normal pixels opposed to each other through the shortest distance across the defective pixel DP3 to be corrected, the values of the surrounding normal pixels may be reflected as much as possible.

Step S16 (correct minimum defective pixel: corresponding to steps (e) and (f) and processes (e) and (f))

Figure 19:
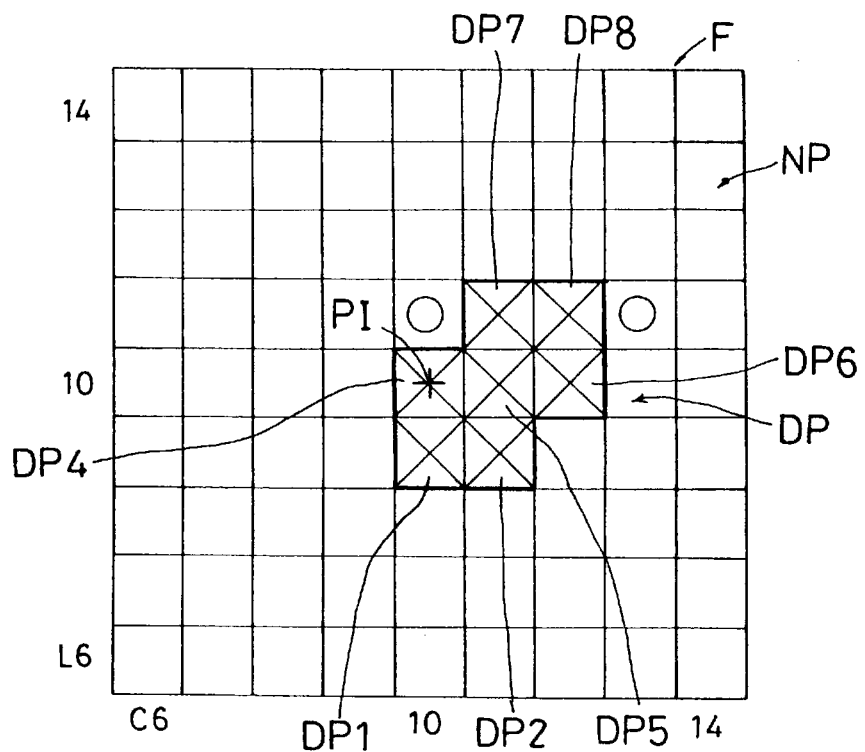
FIG. 19 is a schematic view showing a step of correcting the defective pixels.

The pixel correcting unit 45 replaces the value of minimum defective pixel DP3 with the corrected pixel value computed by the corrected pixel value computing unit 43. Specifically, the data of the pixel group in the evaluation area ER stored in the processing memory 21 is updated. Further, the pixel correcting unit 45 deletes the defective pixel information corresponding to the minimum defective pixel DP3 from the defective pixel identifying unit 35. The defective pixel DP3 is thereafter regarded as normal pixel NP. With the information on the defective pixel DP3 deleted, the defective pixel information now stored in the defective pixel identifying unit 35 is as set out below. FIG. 19 schematically shows the digital image F at this stage.

defective pixels
DP1(L9, C10)
DP2(L9, C11)
DP4(L10, C10)
DP5(L10, C11)
DP6(L10, C12)
DP7(L11, C11)
DP8(L11, C12)

Subsequently, the controller 3 refers to the defective pixel information in the defective pixel identifying unit 35 at step S17 (corresponding to step (g) and process (g)), and repeats the above processing until this information is exhausted. Currently the defective pixel identifying unit 35 possesses information on the seven defective pixels noted above. Thus, the controller 3 reverts to step S13 (compute consecution numbers) to repeat the processing.

Step S13 (compute consecution numbers)

The consecution number computing unit 39 computes the numbers of defective pixels consecutive in the direction across the rows and in the direction across the columns for each of the seven defective pixels DP1, DP2 and DP4–DP8. The consecution numbers of the respective defective pixels are as follows:

| defect. pixels | con. numbers across rows | con. numbers across columns |
| --- | --- | --- |
| DP1(L9, C10) | 2 | 2 |
| DP2(L9, C11) | 3 | 2 |
| DP4(L10, C10) | 2 | 3 |
| DP5(L10, C11) | 3 | 3 |
| DP6(L10, C12) | 2 | 3 |

-continued

| defect. pixels | con. numbers across rows | con. numbers across columns |
| --- | --- | --- |
| DP7(L11, C11) | 3 | 2 |
| DP8(L11, C12) | 2 | 2 |

Step S14 (determine minimum defective pixel)

The minimum defective pixel computing unit 41 determines a defective pixel having the smallest consecution number in the direction across the rows and in the direction across the columns among the defective pixels DP1, DP2 and DP4–DP8. In this instance, all of the defective pixels DP1, DP2 and DP4–DP8, except defective pixel DP5, have the smallest consecution number "2" either in the direction across the rows or in the direction across the columns. In such a case, a minimum defective pixel cannot be determined. The consecution number computing unit 39 refers to the rules stored in the processing rule storage 37. As noted hereinbefore, these rules give priority to an upper defective pixel when a plurality of defective pixels having the same consecution number are found in the direction across the rows, and to a left defective pixel when a plurality of defective pixels having the same consecution number are found in the direction across the columns. In this case, the defective pixels DP7 and DP8 lie in uppermost positions, and are processed with priority. That is, the defective pixels DP7 and DP8 are regarded as minimum defective pixels.

Step S15 (compute corrected pixel value)

The corrected pixel value computing unit 43 computes corrected values of defective pixels DP7 and DP8. Since the defective pixel DP7 has the smallest consecution number "2" in the direction across the columns, the corrected pixel value may be computed by linear interpolation from the values of two normal pixels NP(L11, C10) and NP(L11, C13) opposed to each other in that direction. However, the defective pixels DP8 has the same consecution number "2" both in the direction across the rows and in the direction across the columns. There arises a question as to which direction should be chosen for an interpolation based on normal pixels. In this case also, reference is made to one of the rules stored in the processing rule storage 37. This rule specifies that, in the event of the smallest number both in the direction across the rows and in the direction across the columns, the direction of correction is switched from what was for correcting the preceding defective pixel. The preceding defective pixel corrected is defective pixel DP3 which was corrected at step S15 executed previously. The defective pixel DP3 was corrected based on the normal pixels arranged in the direction across the rows (i.e. in the vertical direction). Thus, at this time, the defective pixel DP8 is corrected based on normal pixels arranged in the direction across the columns (i.e. in the horizontal direction). That is, as in the case of defective pixel DP7 noted above, a corrected value is computed by linear interpolation from the values of normal pixels NP(L11, C10) and NP(L11, C13) arranged in that direction.

Figure 20:
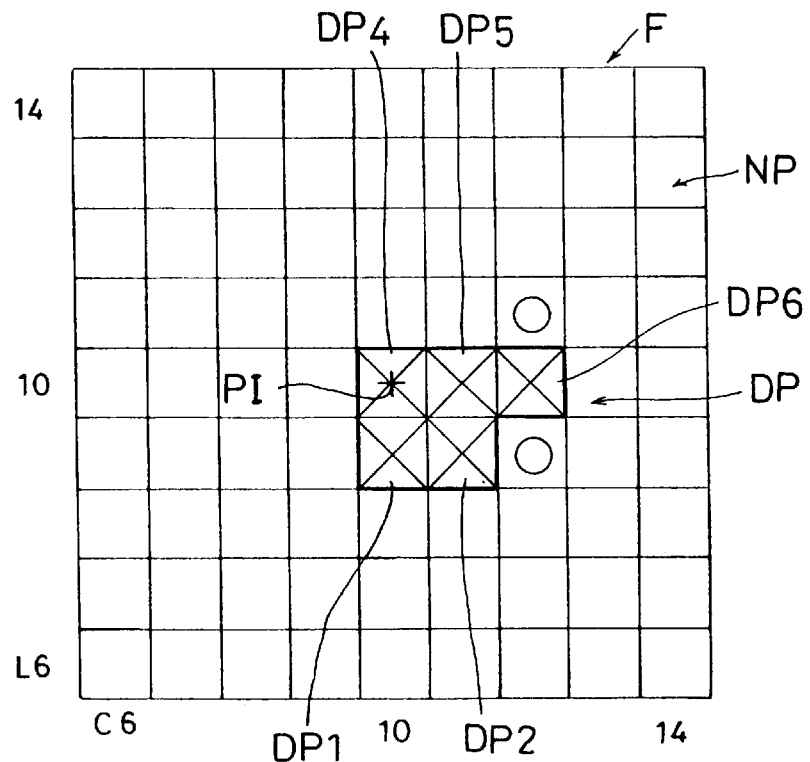
FIG. 20 is a schematic view showing a step of correcting the defective pixels.

At step S16, the values of defective pixels DP7 and DP8 are replaced. The operation then returns to step S13 through step S17. The defective pixel identifying unit 35 now stores defective pixel information as set out below. FIG. 20 schematically shows the digital image F at this stage.

defective pixels

DP1(L9, C10)

DP2(L9, C11)

DP4(L10, C10)

DP5(L10, C11)

DP6(L10, C12)

The following consecution numbers are computed at step S13:

| defect. pixels | con. numbers across rows | con. numbers across columns |
| --- | --- | --- |
| DP1(L9, C10) | 2 | 2 |
| DP2(L9, C11) | 2 | 2 |
| DP4(L10, C10) | 2 | 3 |
| DP5(L10, C11) | 2 | 3 |
| DP6(L10, C12) | 1 | 3 |

At step S14, the defective pixel DP6 having the smallest consecution number "1" is set as a minimum defective pixel.

Figure 21:
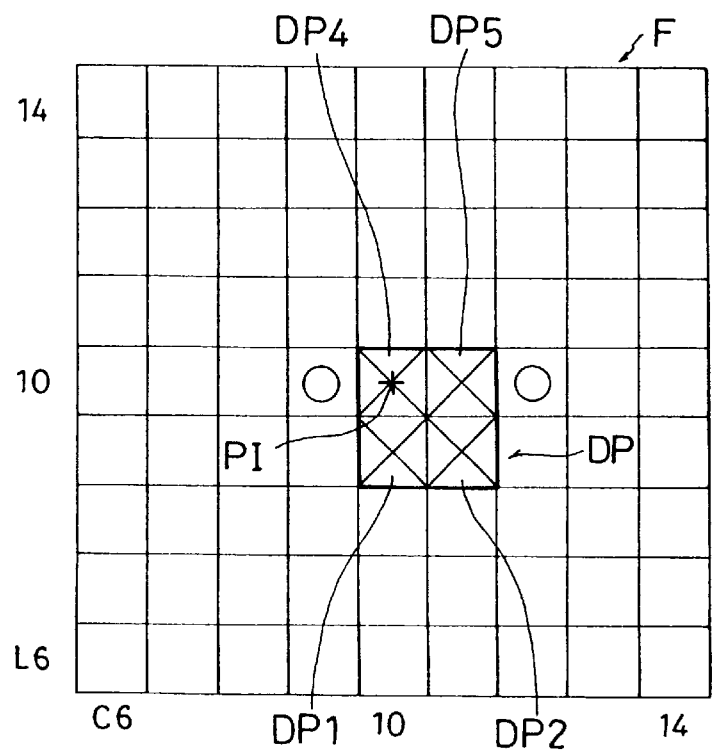
FIG. 21 is a schematic view showing a step of correcting the defective pixels.

At step S15, a corrected pixel value is computed from the values of normal pixels NP(L11, C12) and NP(L9, C12) arranged in the direction across the rows (vertical direction) together with the minimum defective pixel DP6. The corrected pixel value is substituted at step S16. The defective pixel identifying unit 35 now stores defective pixel information as set out below. FIG. 21 schematically shows the digital image F at this stage.

defective pixels

DP1(L9, C10)

DP2(L9, C11)

DP4(L10, C10)

DP5(L10, C11)

The following consecution numbers are computed at step S13:

| defect. pixels | con. numbers across rows | con. numbers across columns |
| --- | --- | --- |
| DP1(L9, C10) | 2 | 2 |
| DP2(L9, C11) | 2 | 2 |
| DP4(L10, C10) | 2 | 2 |
| DP5(L10, C11) | 2 | 2 |

Figure 22:
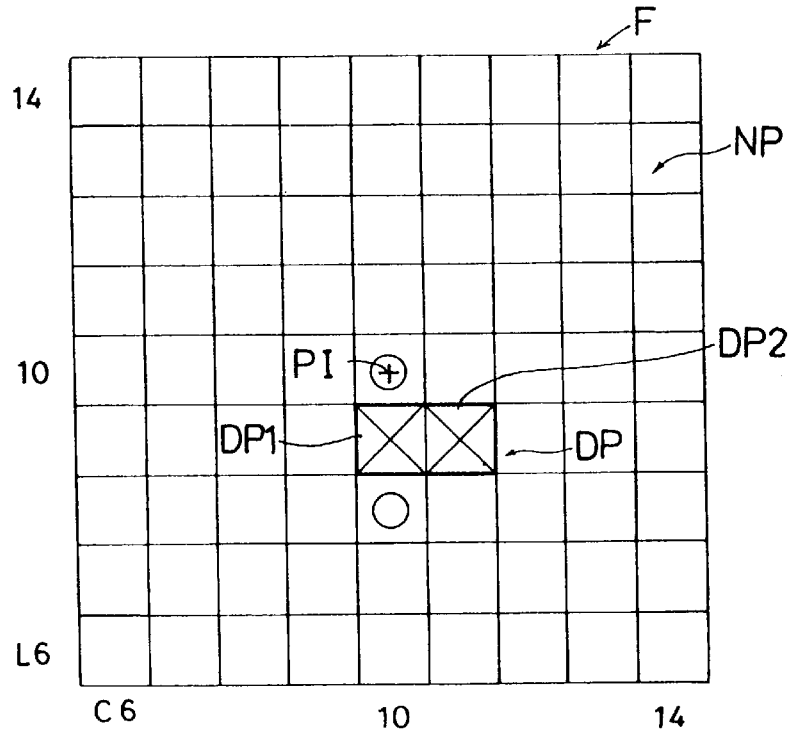
FIG. 22 is a schematic view showing a step of correcting the defective pixels.

At step 14, reference is made to the rules stored in the processing rule storage 37, and upper defective pixels DP4 and DP5 are set as minimum defective pixels. At step S15, a corrected pixel value of each of defective pixels DP4 and DP5 is computed from the values of normal pixels NP(L10, C9) and NP(L10, C12), which is substituted at step S16. The defective pixel identifying unit 35 now stores defective pixel information as set out below. FIG. 22 schematically shows the digital image F at this stage.

defective pixels

DP1(L9, C10)

DP2(L9, C11)

Subsequently, the steps are repeated to provide the following results:

Step S13

| defect. pixels | con. numbers across rows | con. numbers across columns |
| --- | --- | --- |
| DP1(L9, C10) | 1 | 2 |
| DP2(L9, C11) | 1 | 2 |

Steps S14–S16

Defective pixel DP1 is set as a minimum defective pixel, pursuant to the rule that gives priority to a left defective pixel when a plurality of defective pixels having the same consecution number are found in the direction across the columns. A corrected pixel value is computed based on normal pixels NP(L10, C10) and NP(L8, C10). Defective pixel DP1 is thereby corrected.

Figure 23:
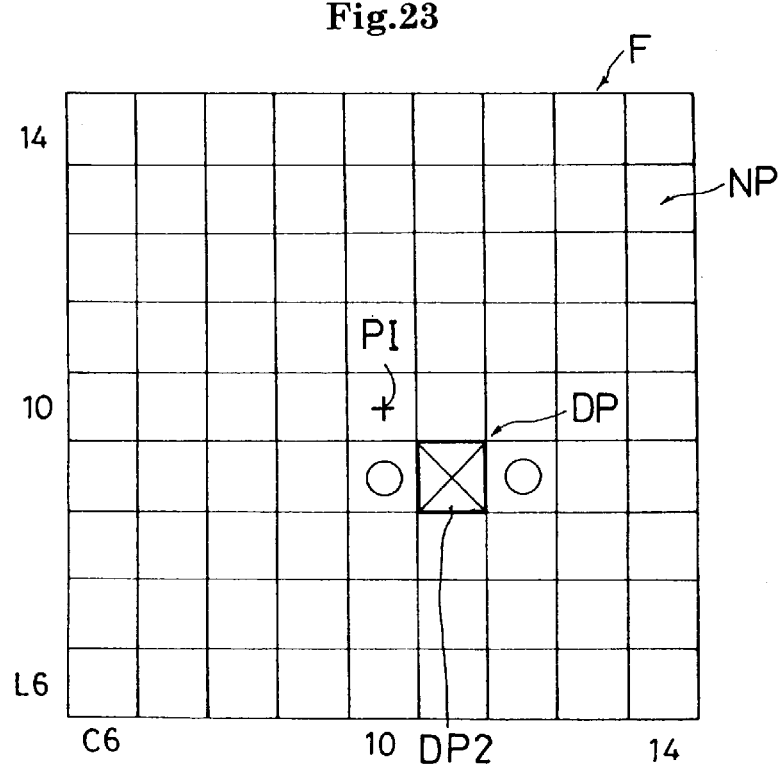
FIG. 23 is a schematic view showing a step of correcting the defective pixels.

Then, defective pixel information is as set out below. FIG. 23 schematically shows the digital image F at this stage.

defective pixel
DP2(L9, C10)
Step S13

| defect. pixel | con. number across rows | con. number across columns |
|---|---|---|
| DP2(L9, C11) | 1 | 1 |

Steps S14–S16

Defective pixel DP2 is set as a minimum defective pixel. A corrected pixel value is computed based on normal pixels NP(L9, C16) and NP(L9, C12) arranged in the different direction to the direction (of rows) for correcting the preceding defective pixel DP1, pursuant to the rule noted hereinbefore. Defective pixel DP2 is thereby corrected.

At this point, all the defective pixel information has been deleted from the defective pixel identifying unit 35. The processing is terminated after step S17.

Figure 1:
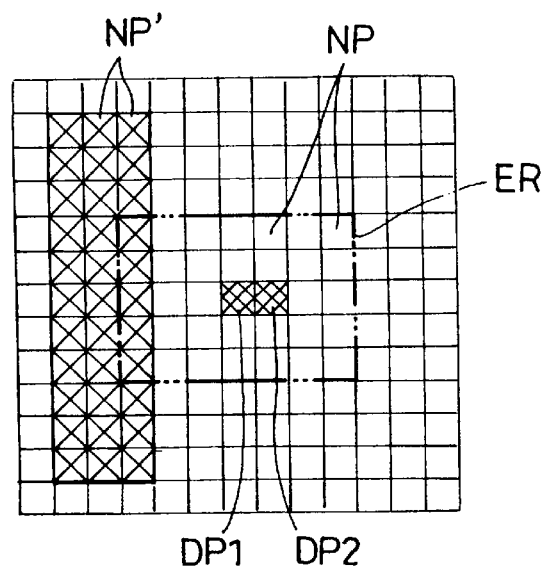
FIG. 1 is an explanatory view of a conventional method of identifying defective pixels.
Figure 2:
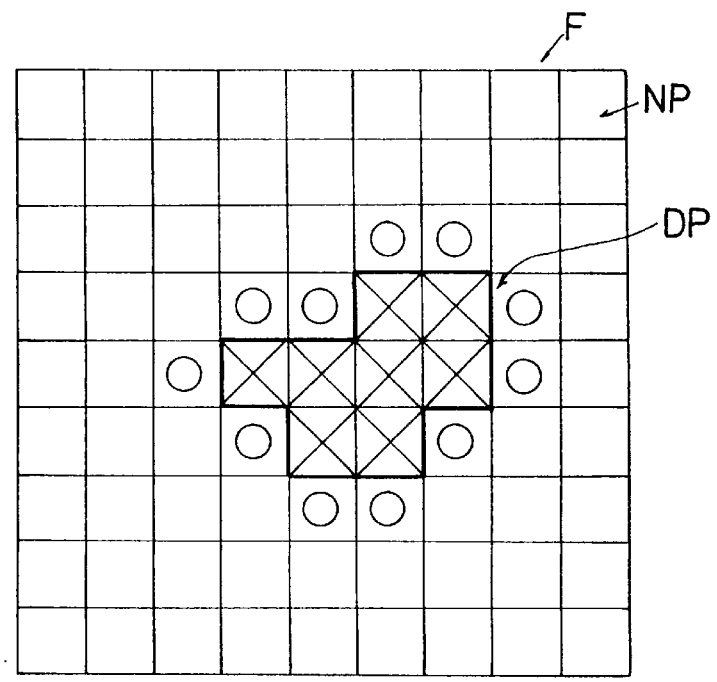
FIG. 2 is an explanatory view of a conventional method of correcting defective pixels.

As described above, the defective pixels DP1–DP8 are corrected successively in the order of closeness to normal pixels, thereby reflecting the values of adjacent normal pixels as much as possible. This process is capable of avoiding a situation experienced in the prior art, as shown in FIG. 2, where all defective pixels are given the same value to be incongruous with surrounding normal pixels. That is, the processing according to this invention minimizes texture deterioration in a digital image.

Figure 24:
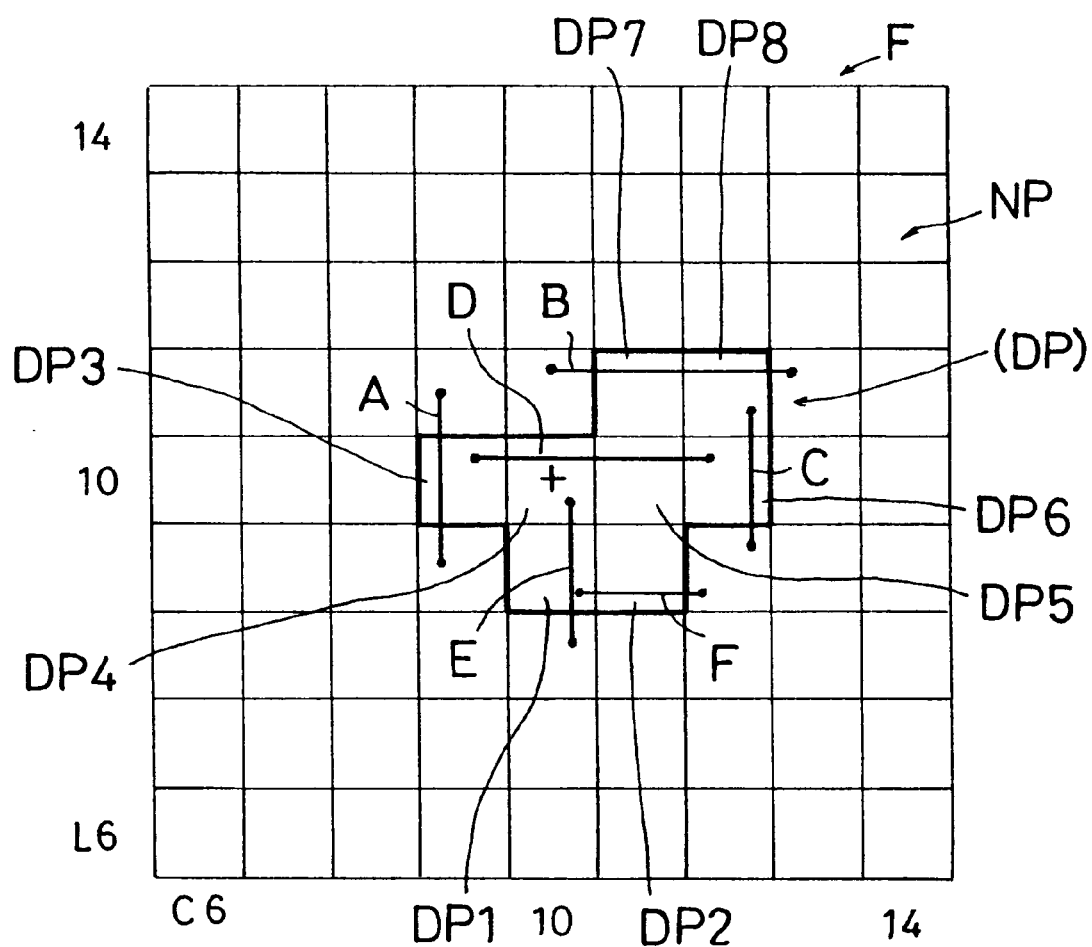
FIG. 24 is a schematic view showing an order of correcting the defective pixels.

FIG. 24 shows the order in which the defective pixels DP1–DP8 are corrected. That is, the correction has been made in the order of references A to F. By alternately switching the direction of correction between the direction across the rows and that across the columns in this way, the corrected pixel values are prevented from pointing to any particular direction. This feature provides an additional effect of suppressing texture deterioration. Even if defective pixels lie in an area called vignette where the pixel values (tone) change, the above processing produces no large level difference, thereby avoiding a serious texture deterioration.

To correct defective pixels, it is necessary to identify the defective pixels first. In this embodiment, the operator has only to designate a single spot adjacent the defective pixels as noted hereinbefore, which minimizes the operator's effort. Thus, the defective pixels may be corrected in a way to minimize texture deterioration while also minimizing the operator's effort.

While the processing rules are inputted to and stored in the processing rule storage 37 in advance, these rules should preferably be changed according to digital images to be processed.

In the foregoing embodiments, the operator designates a pixel adjacent the defective pixels to identify the latter. Various other methods may be employed for identifying the defective pixels. The defective pixels may be identified by using the conventional techniques (1) to (3) cited hereinbefore.

In the above example, the processing has been described in relation to a digital image in black-and-white tones to facilitate understanding. Generally, the processing is often applied to color digital images. In processing a color image, pixel values of the respective colors may be used to compute corrected pixel values at step S15. That is, where the color digital image is expressed in the three colors of R, G and B, corrected pixel values may be obtained by interpolation made in the order of R, G and B.

Figure 13:
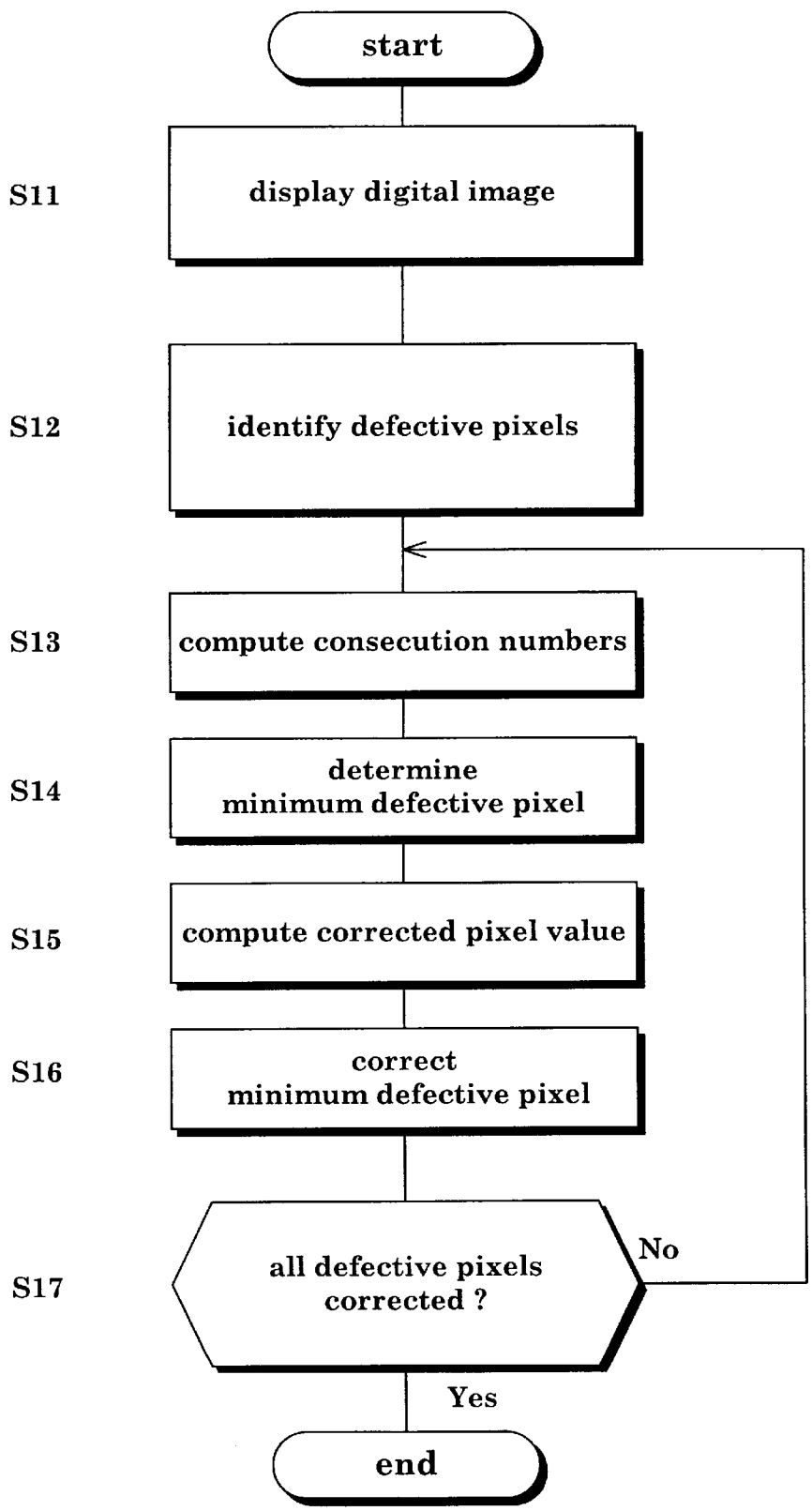
FIG. 13 is a flowchart of an operation of the image processing apparatus shown in FIG. 12.

Steps S12–S17 in the flowchart shown in FIG. 13 correspond to the program for correcting defective pixels according to this invention, which is stored in the recording medium M. Thus, a computer having a construction different from what is shown in the block diagram of FIG. 12 can be used to realize the same effects as the apparatus described hereinbefore, which is achieved by reading and executing the above program from the recording medium M.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method of identifying defective pixels in a digital image converted from an original image by a reading device, the digital image including normal pixels properly converted from the original image, and the defective pixels due to dirt or dust, said method comprising the steps of:

(a) designating a pixel adjacent said defective pixels in said digital image;

(b) setting, as an evaluation area, a group of pixels included in a predetermined area size centering on said pixel designated;

(c) setting, as a defective pixel candidate, a pixel having the darkest value among pixels in a central portion of said evaluation area;

(d) computing line averages of pixels around said defective pixel candidate, among pixels in said evaluation area, said line averages being average pixel values, respectively, of upper lines of pixels arranged horizontally above said defective pixel candidate, lower lines of pixels arranged horizontally below said defective pixel candidate, left lines of pixels arranged vertically and leftward of said defective pixel candidate, and right lines of pixels arranged vertically and rightward of said defective pixel candidate;

(e) diminishing said evaluation area by selecting a line having the lightest line average from each group of said upper lines, said lower lines, said left lines and said right lines;

(f) computing a threshold pixel value for determining said defective pixels, from an average pixel value of a rectangular frame defined by said lines selected one each for upper, lower, left and right sides of said rectangular frame; and (g) comparing values of all pixels in said rectangular frame with said threshold pixel value, and determining pixels having values darker than said threshold value to be said defective pixels.

2. A method as defined in claim 1, further comprising a step of setting an area size prior to said step (a).

3. A method as defined in claim 1, wherein said threshold value T is derived from A−S×C, where A is said average pixel value of said rectangular frame, S is a distribution of pixel values in said rectangular frame, and C is a constant.

4. A method as defined in claim 3, wherein said constant C has a value of 2 to 3.

5. A method as defined in claim 1, wherein, when a plurality of lines are found to have the same lightest line average at said step (e), a line remotest from said defective pixel candidate is selected to diminish said evaluation area.

6. An apparatus for identifying defective pixels in a digital image converted from an original image by a reading device, the digital image including normal pixels properly converted from the original image, and the defective pixels due to dirt or dust, said apparatus comprising:

storage means for storing said digital image;

display means for displaying said digital image;

designating means for designating a pixel adjacent said defective pixels in said digital image displayed on said display means;

evaluation area setting means for setting, as an evaluation area, a group of pixels included in a predetermined area size centering on said pixel designated;

defective pixel candidate setting means for setting, as a defective pixel candidate, a pixel having the darkest value among pixels in a central portion of said evaluation area;

average computing means for computing line averages of pixels around said defective pixel candidate, among pixels in said evaluation area, said line averages being average pixel values, respectively, of upper lines of pixels arranged horizontally above said defective pixel candidate, lower lines of pixels arranged horizontally below said defective pixel candidate, left lines of pixels arranged vertically and leftward of said defective pixel candidate, and right lines of pixels arranged vertically and rightward of said defective pixel candidate;

area limiting means for diminishing said evaluation area by selecting a line having the lightest line average from each group of said upper lines, said lower lines, said left lines and said right lines;

threshold computing means for computing a threshold pixel value for determining said defective pixels, from an average pixel value of a rectangular frame defined by said lines selected one each for upper, lower, left and right sides of said rectangular frame; and defective pixel discriminating means for comparing values of all pixels in said rectangular frame with said threshold pixel value, and determining pixels having values darker than said threshold value to be said defective pixels.

7. An apparatus as defined in claim 6, further comprising area setting means for setting an area size.

8. An apparatus as defined in claim 6, wherein said threshold computing means is operable to derive said threshold value T from A−S×C, where A is said average pixel value of said rectangular frame, S is a distribution of pixel values in said rectangular frame, and C is a constant.

9. An apparatus as defined in claim 8, wherein said constant C has a value of 2 to 3.

10. An apparatus as defined in claim 6, wherein, when a plurality of lines are found to have the same lightest line average, said area limiting means is operable to select a line remotest from said defective pixel candidate to diminish said evaluation area.

11. A recording medium storing a program for identifying defective pixels in ac digital image converted from an original image by a reading device, the digital image including normal pixels properly converted from the original image, and the defective pixels due to dirt or dust, said program instructing a computer to carry out the following processes:

(a) designating a pixel adjacent said defective pixels in said digital image;

(b) setting, as an evaluation area, a group of pixels included in a predetermined area size centering on said pixel designated;

(c) setting, as a defective pixel candidate, a pixel having the darkest value among pixels in a central portion of said evaluation area;

(d) computing line averages of pixels around said defective pixel candidate, among pixels in said evaluation area, said line averages being average pixel values, respectively, of upper lines of pixels arranged horizontally above said defective pixel candidate, lower lines of pixels arranged horizontally below said defective pixel candidate, left lines of pixels arranged vertically and leftward of said defective pixel candidate, and right lines of pixels arranged vertically and rightward of said defective pixel candidate;

(e) diminishing said evaluation area by selecting a line having the lightest line average from each group of said upper lines, said lower lines, said left lines and said right lines;

(f) computing a threshold pixel value for determining said defective pixels, from an average pixel value of a rectangular frame defined by said lines selected one each for upper, lower, left and right sides of said rectangular frame; and (g) comparing values of all pixels in said rectangular frame with said threshold pixel value, and determining pixels having values darker than said threshold value to be said defective pixels.

12. A method of correcting defective pixels in a digital image converted from an original image by a reading device, the defective pixels being caused by dirt or dust, said method comprising the steps of:

(a) identifying said defective pixels in said digital image;

(b) computing, for each of said defective pixels, the number of defective pixels consecutive in a direction across rows as a consecution number in said direction across rows, and the number of defective pixels consecutive in a direction across columns as a consecution number in said direction across columns;

(c) determining a minimum consecution number among said consecution numbers in said direction across rows and said consecution numbers in said direction across columns, and determining a defective pixel having said minimum consecution number to be a minimum defective pixel;

(d) computing a corrected value for said minimum defective pixel from values of normal pixels opposed to each other across said minimum defective pixel in a direction of said minimum consecution number;

(e) substituting said corrected value for a value of said minimum defective pixel;

(f) regarding said minimum defective pixel as a normal pixel; and (g) repeating steps (b) through (f) until all of said defective pixels become normal pixels.

13. A method as defined in claim 12, wherein said corrected value is computed at step (d) by linear interpolation from values of two normal pixels opposed to each other across said minimum defective pixel.

14. A method as defined in claim 12, wherein, when a plurality of minimum consecution numbers are found in said direction across rows, an upper one of defective pixels having said minimum consecution numbers is determined to be said minimum defective pixel, and when a plurality of minimum consecution numbers are found in said direction across columns, a left one of defective pixels having said minimum consecution numbers is determined to be said minimum defective pixel.

15. A method as defined in claim 12, wherein, when said minimum consecution number is found both in said direction across rows and in said direction across columns, step (d) is repeated by alternately switching directions.

16. An apparatus for correcting defective pixels in a digital image converted from an original image by a reading device, the defective pixels being caused by dirt or dust, said apparatus comprising:

storage means for storing said digital image;

display means for displaying said digital image;

defective pixel identifying means for identifying said defective pixels in said digital image displayed on said display means;

consecution number computing means for computing, for each of said defective pixels, the number of defective pixels consecutive in a direction across rows as a consecution number in said direction across rows, and the number of defective pixels consecutive in a direction across columns as a consecution number in said direction across columns;

minimum defective pixel computing means for determining a minimum consecution number among said consecution numbers in said direction across rows and said consecution numbers in said direction across column, and determining a defective pixel having said minimum consecution number to be a minimum defective pixel;

corrected pixel value computing means for computing a corrected value for said minimum defective pixel from values of normal pixels opposed to each other across said minimum defective pixel in a direction of said minimum consecution number;

pixel correcting means for substituting said corrected value for a value of said minimum defective pixel, said minimum defective pixel being now regarded as a normal pixel; and control means for repeatedly controlling said consecution number computing means, said minimum defective pixel computing means, said corrected pixel value computing means and said pixel correcting means until all of said defective pixels become normal pixels.

17. An apparatus as defined in claim 16, wherein said corrected pixel value computing means is operable to compute said corrected value by linear interpolation from values of two normal pixels opposed to each other across said minimum defective pixel.

18. An apparatus as defined in claim 16, wherein said minimum defective pixel computing means is operable, when a plurality of minimum consecution numbers are found in said direction across rows, to determine an upper one of defective pixels having said minimum consecution numbers to be said minimum defective pixel, and when a plurality of minimum consecution numbers are found in said direction across columns, to determine a left one of defective pixels having said minimum consecution numbers to be said minimum defective pixel.

19. An apparatus as defined in claim 16, wherein said corrected pixel value computing means is operable to switch directions alternately when said minimum consecution number is found both in said direction across rows and in said direction across columns.

20. A recording medium storing a program for correcting defective pixels in a digital image converted from an original image by a reading device, the defective pixels being caused by dirt or dust, said program instructing a computer to carry out the following processes:

(a) identifying said defective pixels in said digital image;

(b) computing, for each of said defective pixels, the number of defective pixels consecutive in a direction across rows as a consecution number in said direction across rows, and the number of defective pixels consecutive in a direction across columns as a consecution number in said direction across columns;

(c) determining a minimum consecution number among said consecution numbers in said direction across rows and said consecution numbers in said direction across columns, and determining a defective pixel having said minimum consecution number to be a minimum defective pixel;

(d) computing a corrected value for said minimum defective pixel from values of normal pixels opposed to each other across said minimum defective pixel in a direction of said minimum consecution number;

(e) substituting said corrected value for a value of said minimum defective pixel;

(f) regarding said minimum defective pixel as a normal pixel; and (g) repeating steps (b) through (f) until all of said defective pixels become normal pixels.

* * * * *